Figure 1:
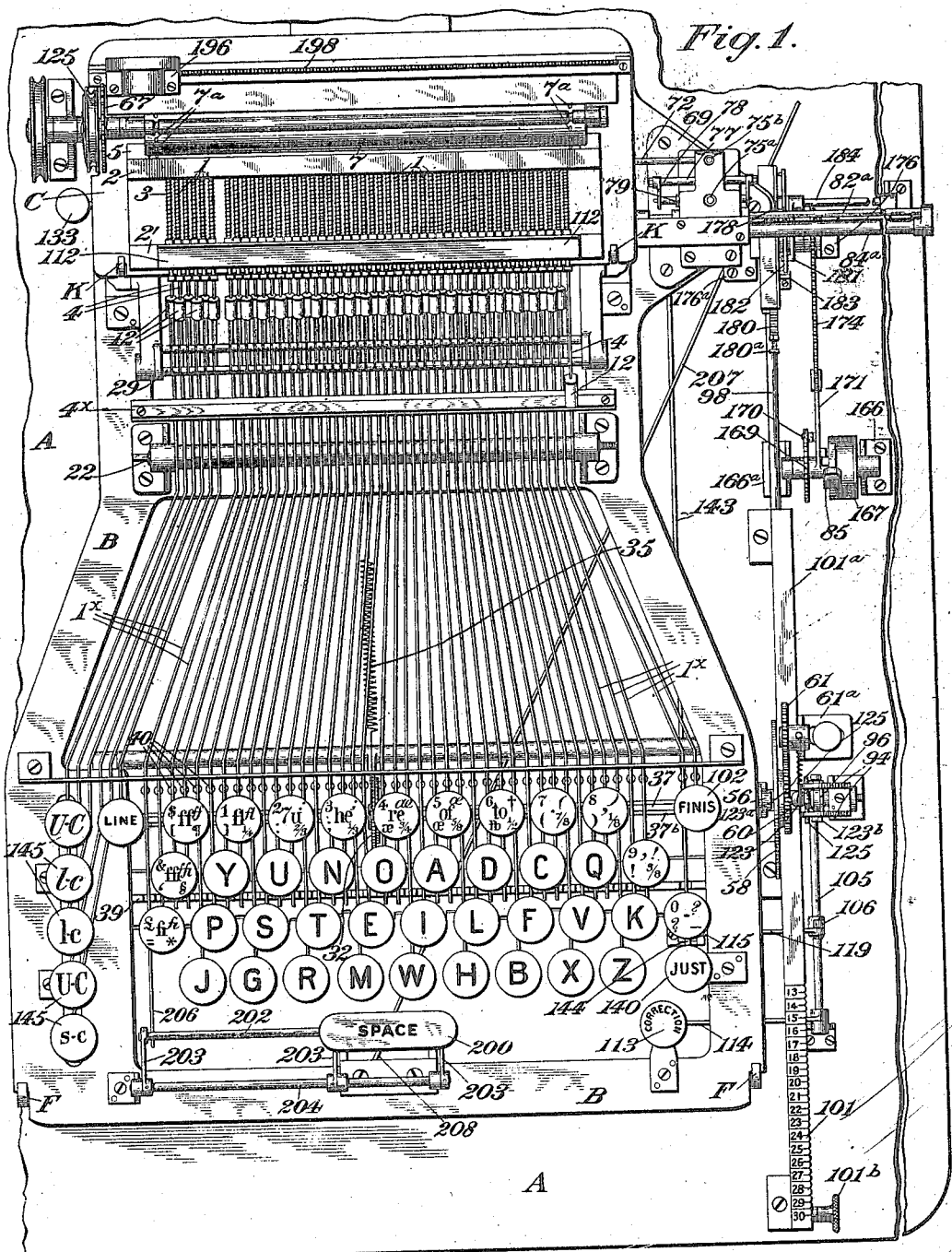

F. E. DRISCOLE.
MACHINE FOR MAKING A COMPOSING RIBBON OR CONTROLLER FOR AUTOMATIC TYPOGRAPHIC MACHINES.
APPLICATION FILED MAR. 13, 1903.

1,136,082.

Patented Apr. 20, 1915.
13 SHEETS—SHEET 1.

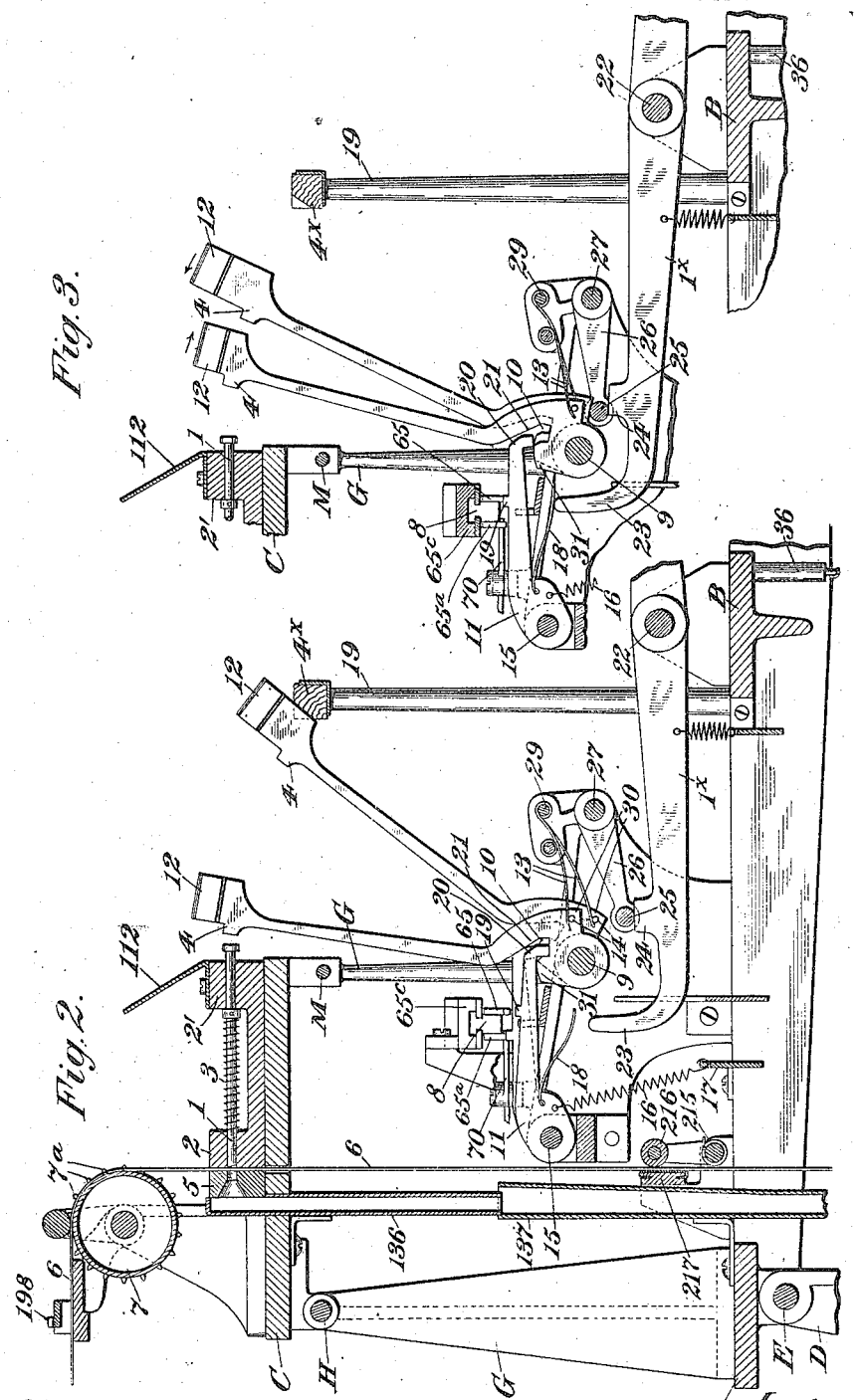

F. E. DRISCOLE.
MACHINE FOR MAKING A COMPOSING RIBBON OR CONTROLLER FOR AUTOMATIC TYPOGRAPHIC MACHINES.
APPLICATION FILED MAR. 13, 1903.
1,136,082.
Patented Apr. 20, 1915.
13 SHEETS—SHEET 3.
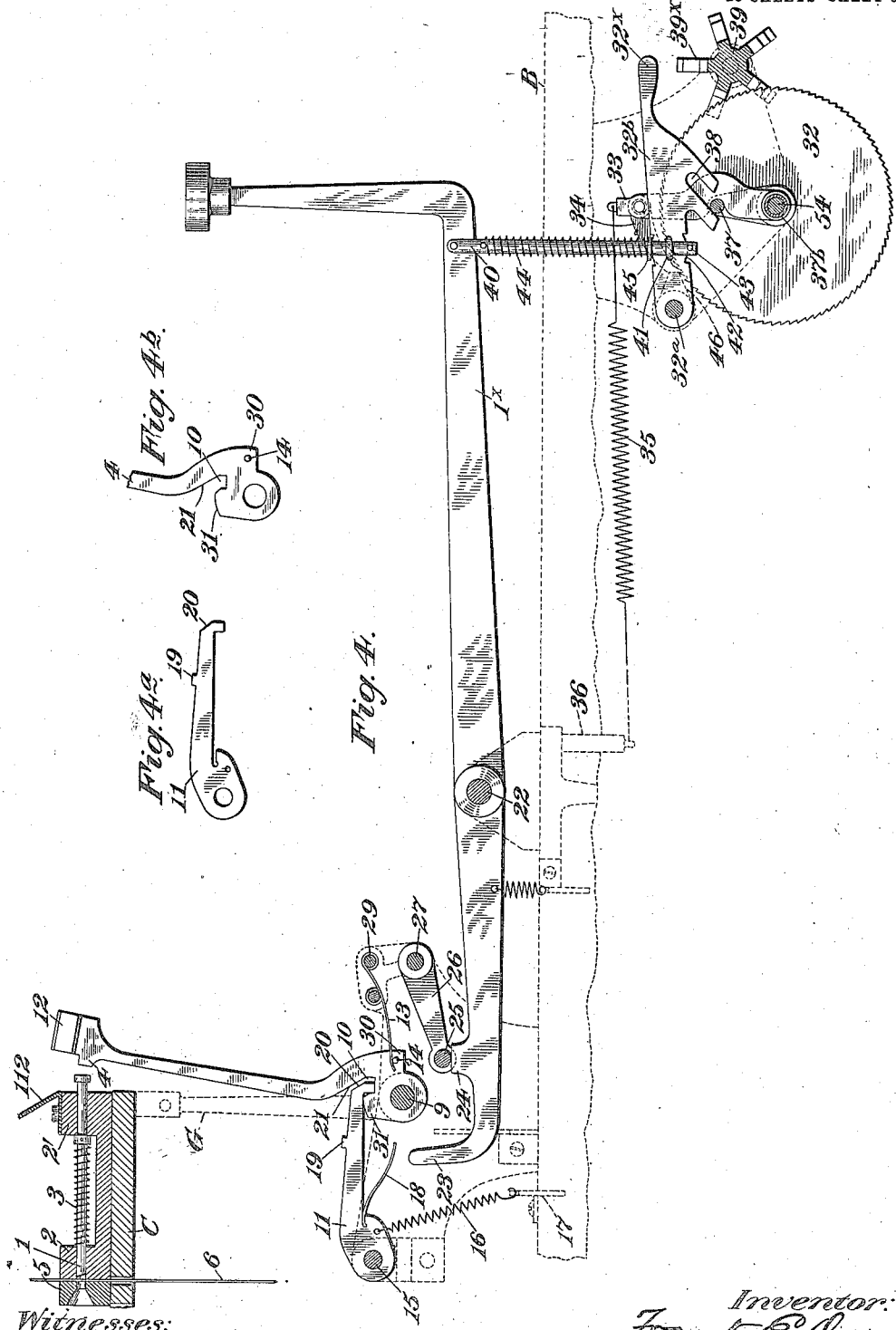

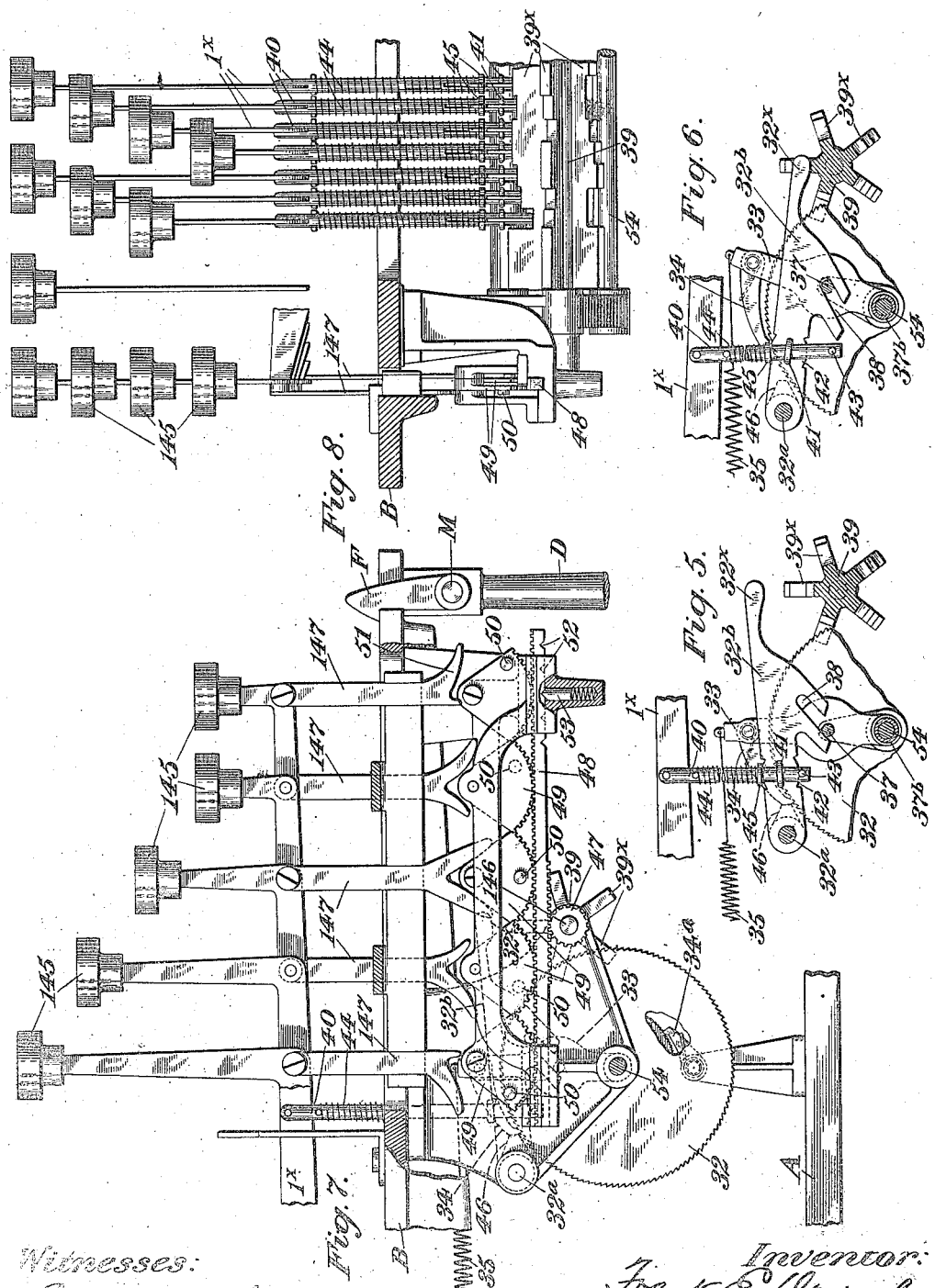

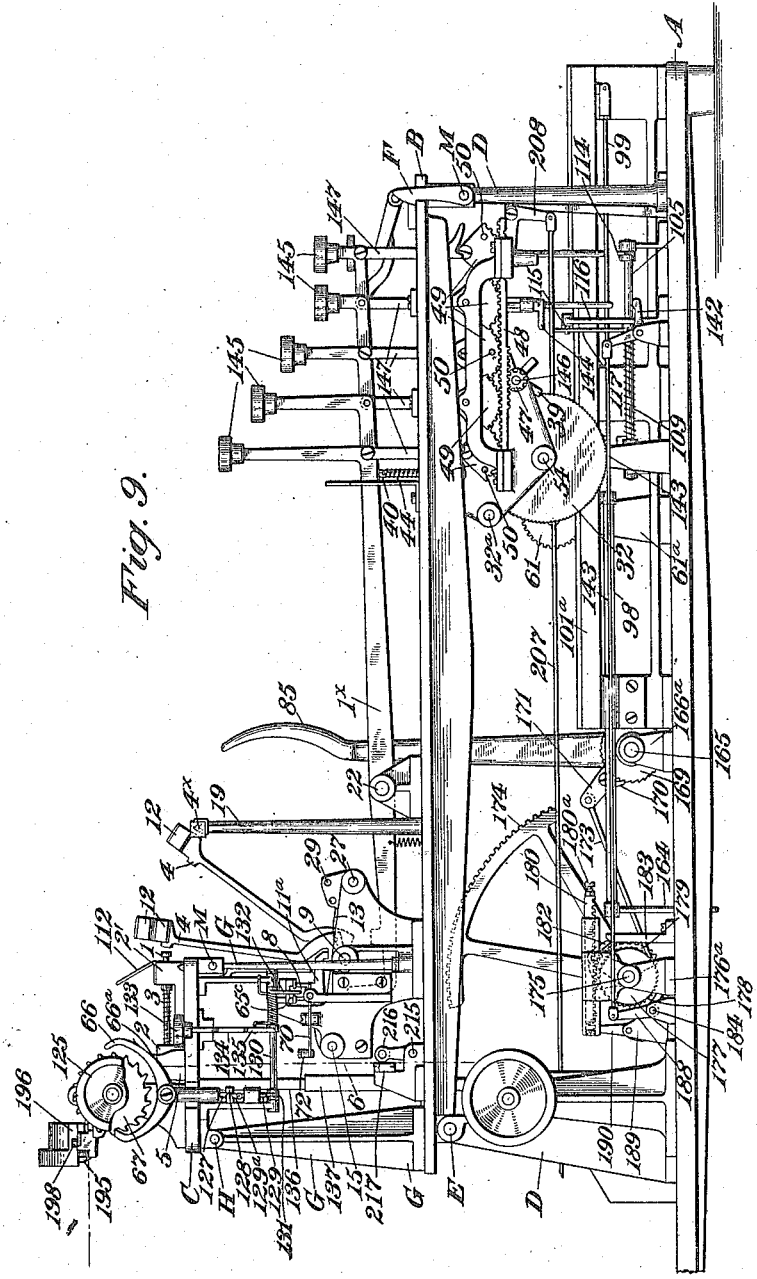

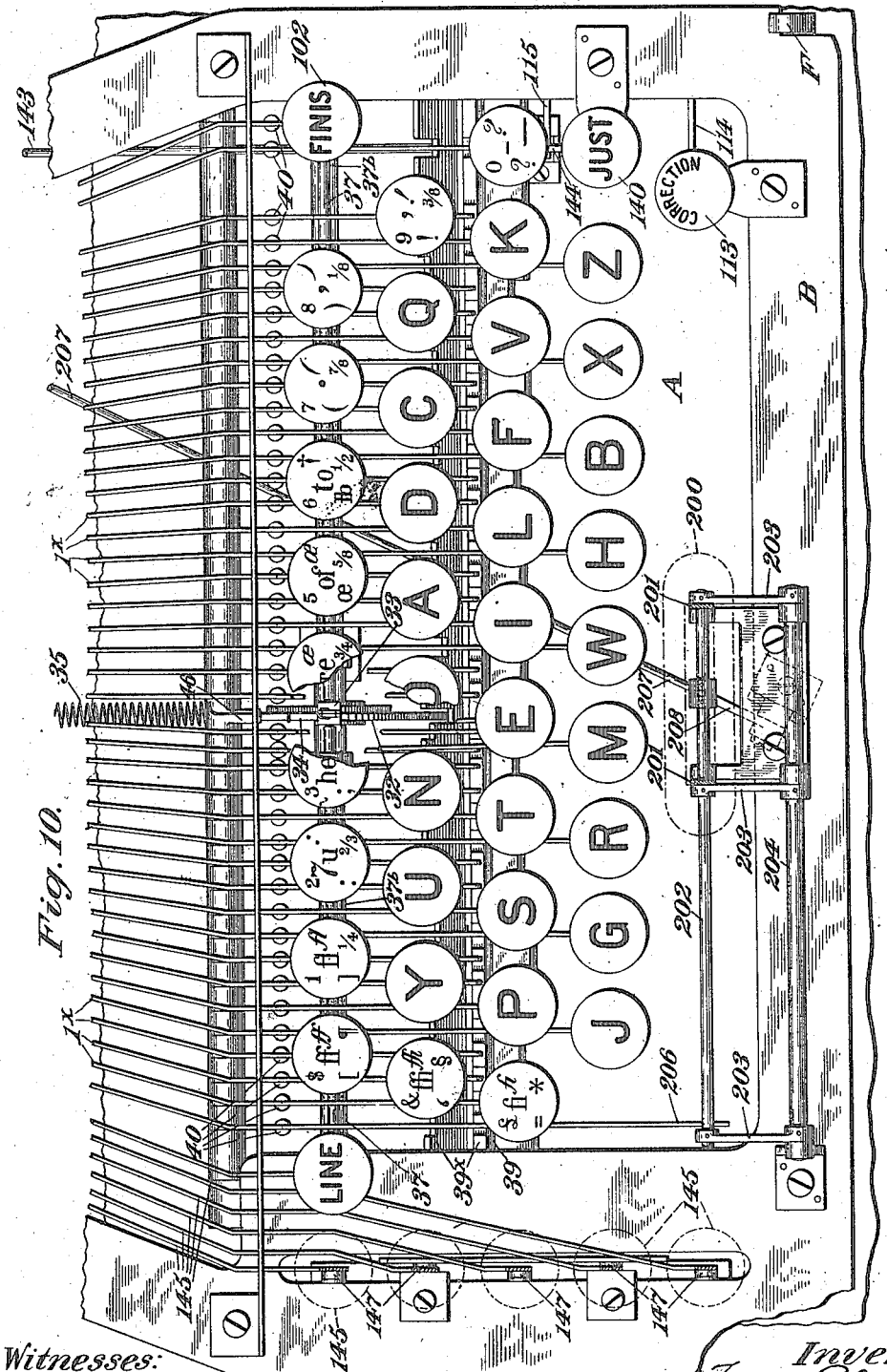

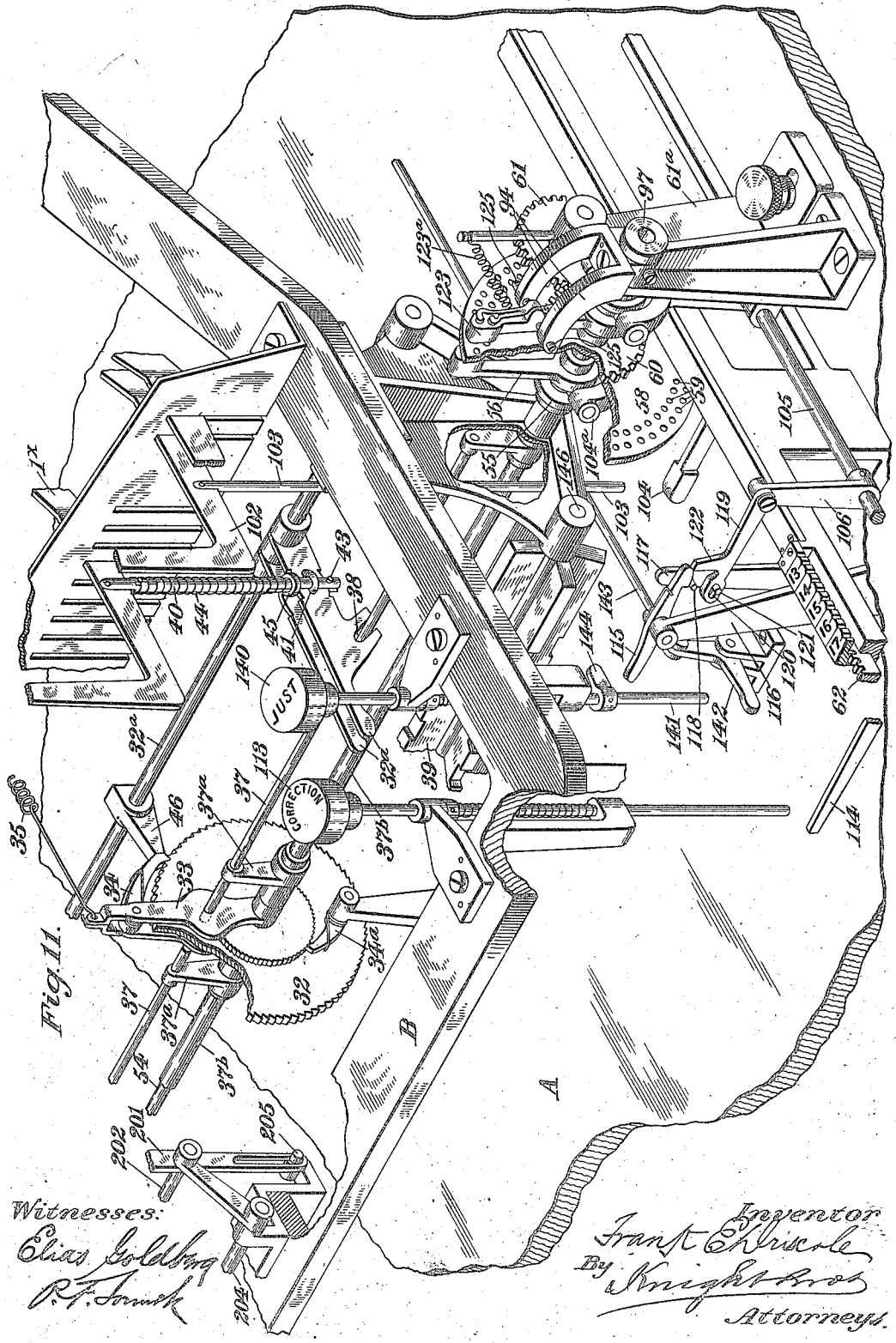

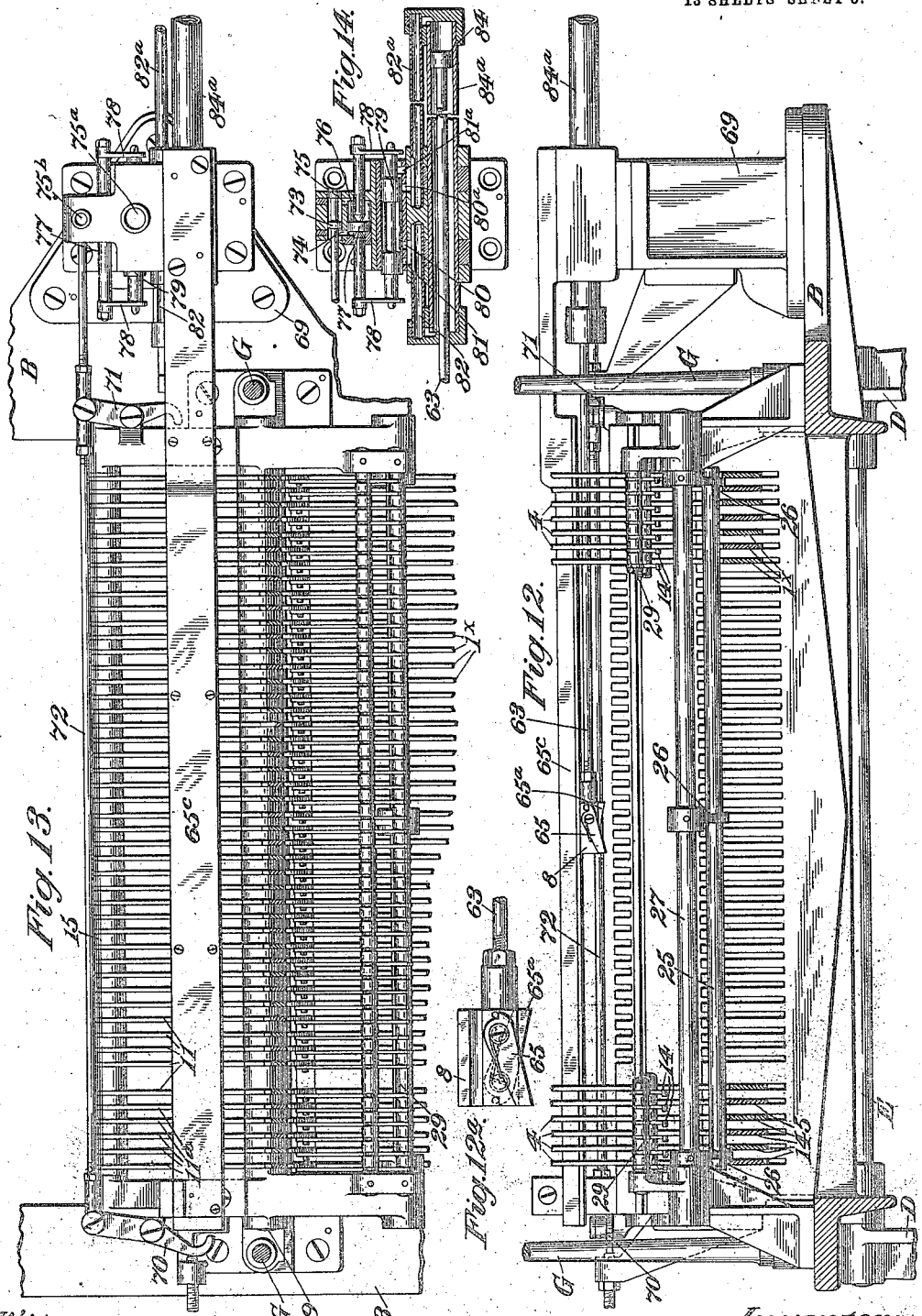

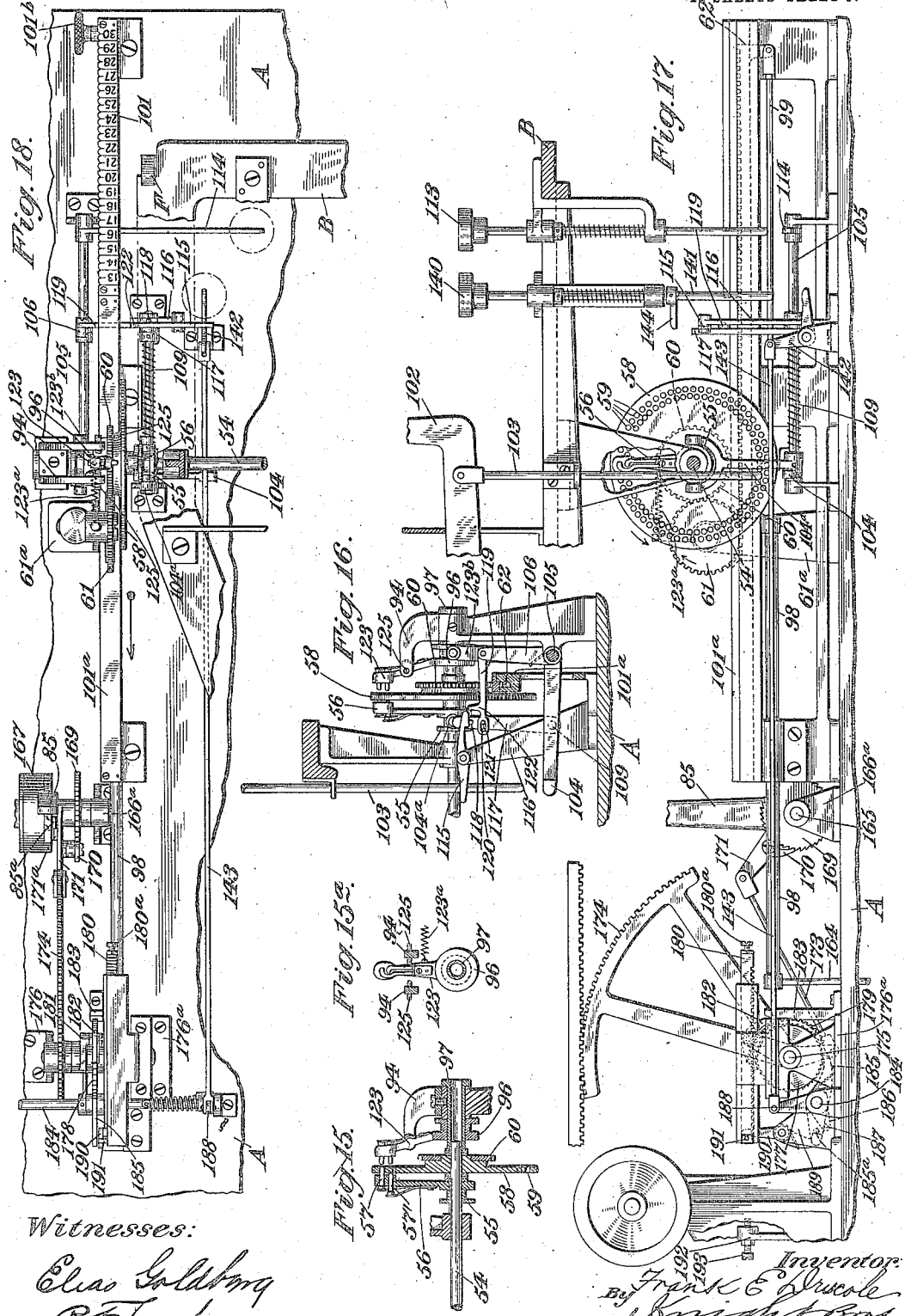

F. E. DRISCOLE.
MACHINE FOR MAKING A COMPOSING RIBBON OR CONTROLLER FOR AUTOMATIC TYPOGRAPHIC MACHINES.
APPLICATION FILED MAR. 13, 1903.
1,136,082. Patented Apr. 20, 1915.
13 SHEETS—SHEET 10.
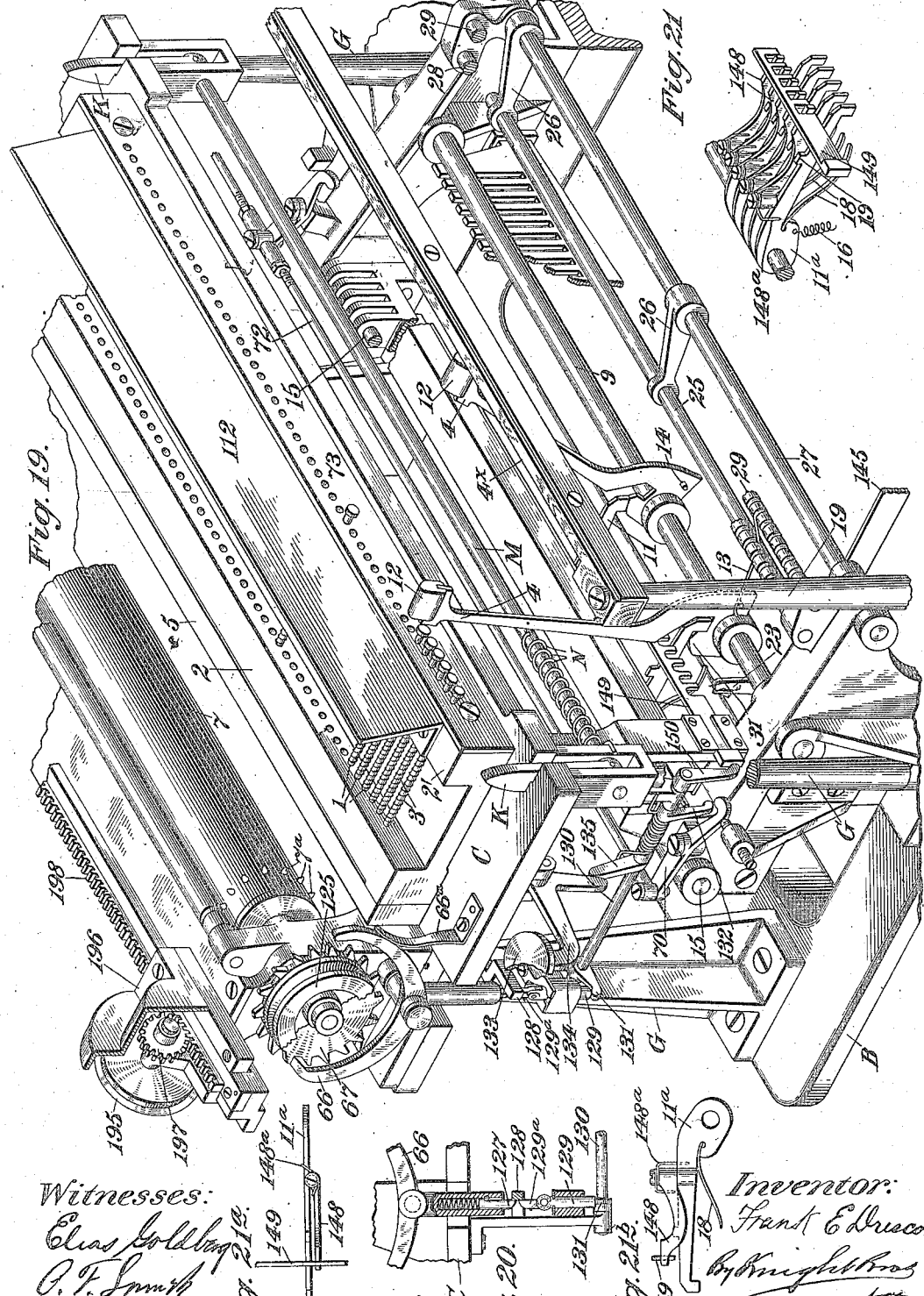
Witnesses:
Elias Goldberg
O. F. Smith
Inventor:
Frank E Driscole
By Knight Bros
Attys F. E. DRISCOLE.
MACHINE FOR MAKING A COMPOSING RIBBON OR CONTROLLER FOR AUTOMATIC TYPOGRAPHIC MACHINES.
APPLICATION FILED MAR. 13, 1903.
1,136,082. Patented Apr. 20, 1915.
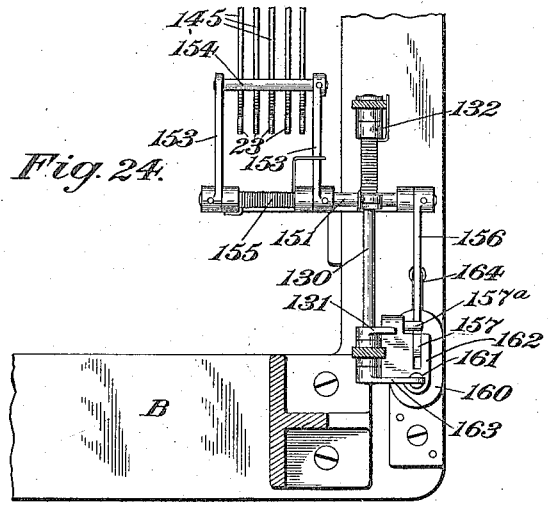
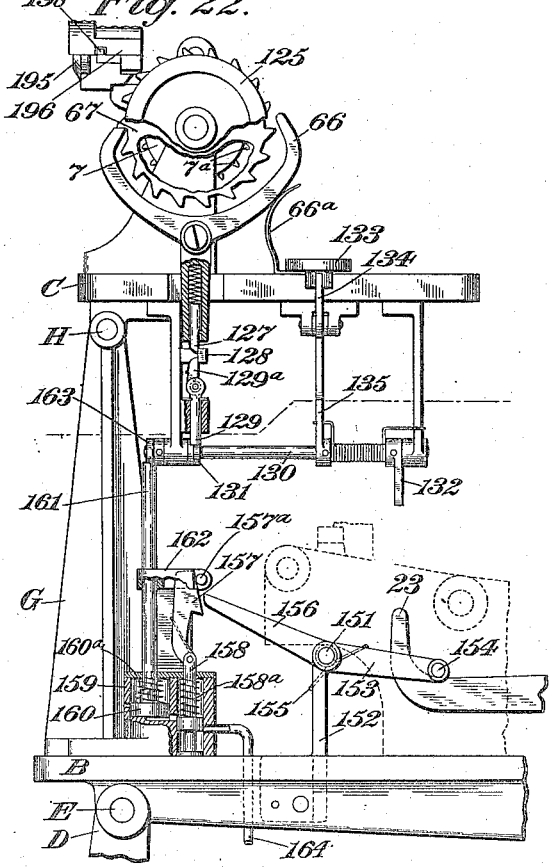
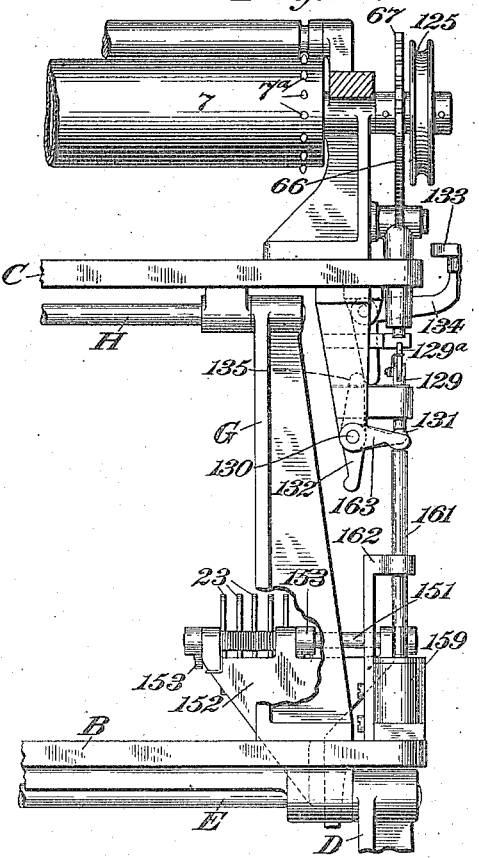

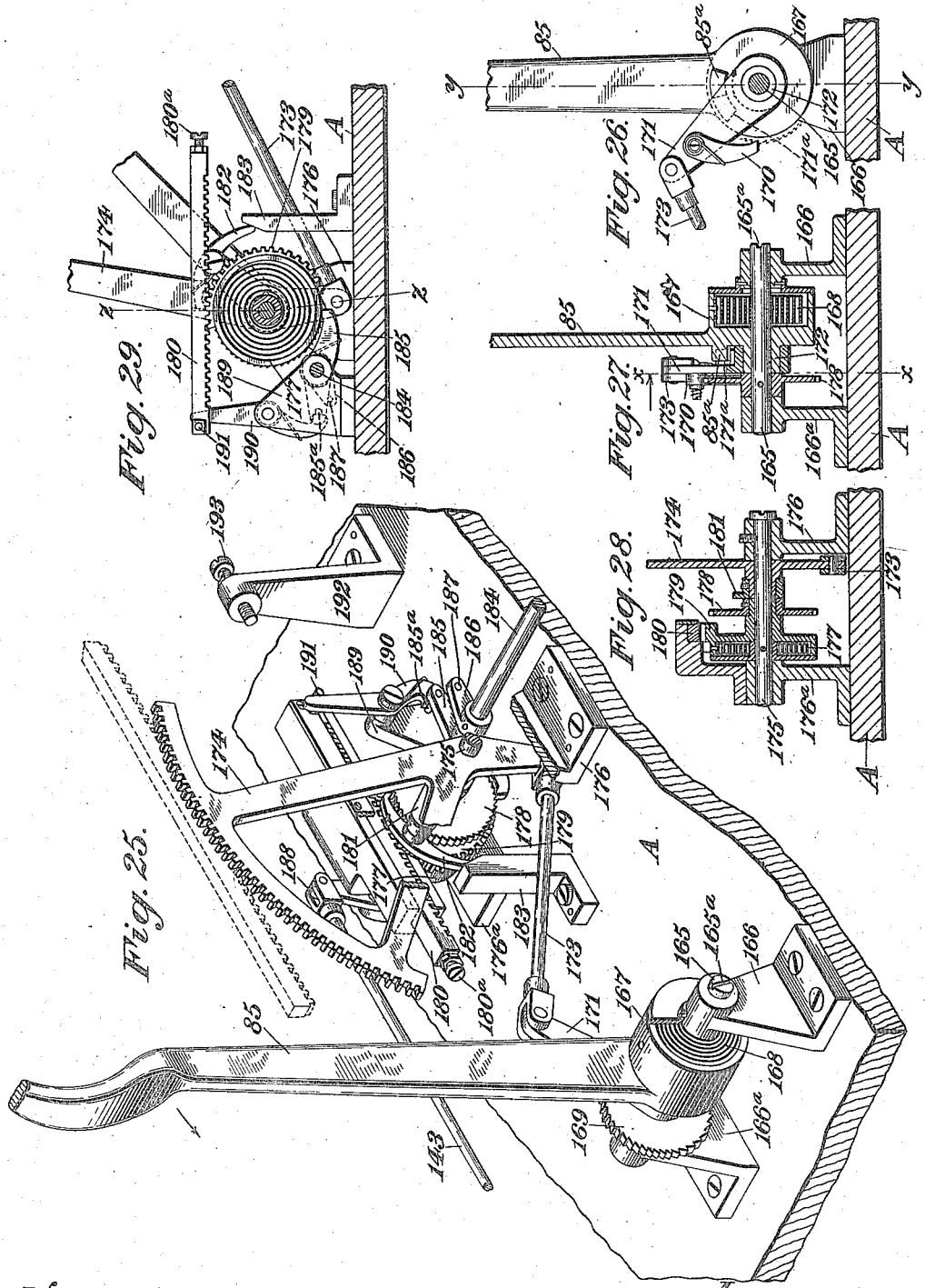

F. E. DRISCOLE.
MACHINE FOR MAKING A COMPOSING RIBBON OR CONTROLLER FOR AUTOMATIC TYPOGRAPHIC MACHINES.
APPLICATION FILED MAR. 13, 1903.
1,136,082.
Patented Apr. 20, 1915.
13 SHEETS—SHEET 13.
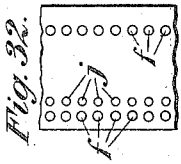
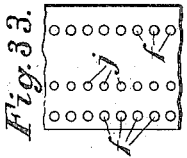
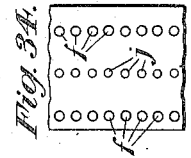
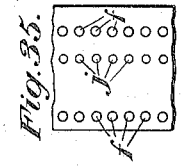
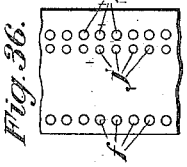
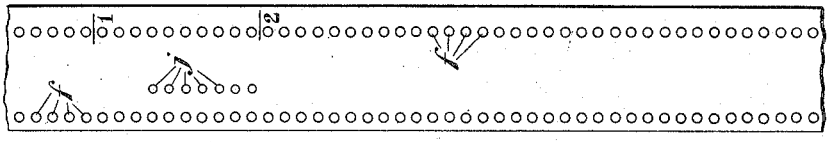
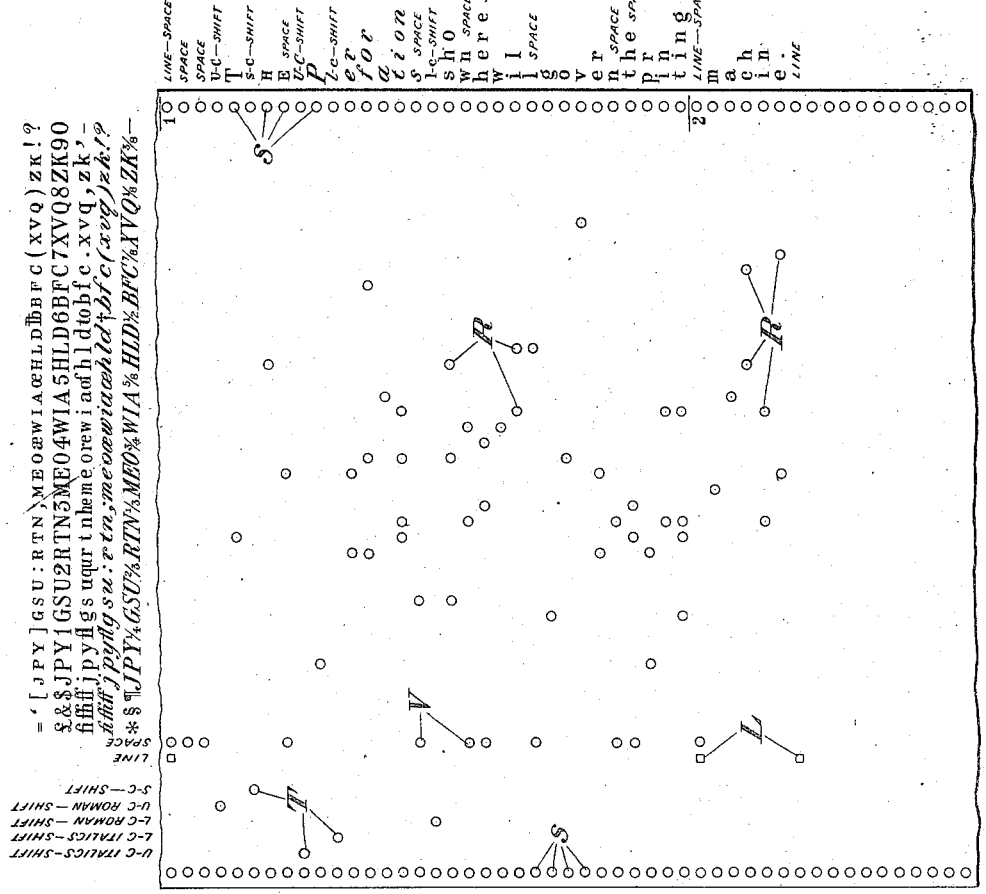
Witnesses:
Elias Goldberg
P. F. Somek
Inventor:
Frank E. Driscole
By Knight Bros.
Attorneys.

UNITED STATES PATENT OFFICE.

FRANK E. DRISCOLE, OF JERSEY CITY, NEW JERSEY, ASSIGNOR, BY MESNE ASSIGN-
MENTS, TO JAMES G. COFFIN, TRUSTEE.

MACHINE FOR MAKING A COMPOSING-RIBBON OR CONTROLLER FOR AUTOMATIC
TYPOGRAPHIC MACHINES.

1,136,082.  Specification of Letters Patent.  Patented Apr. 20, 1915.

Application filed March 13, 1903. Serial No. 147,585.

*To all whom it may concern:*

Be it known that I, FRANK E. DRISCOLE, a citizen of the United States, residing in Jersey City, in the county of Hudson and State of New Jersey, have invented a new and improved Machine for Making a Composing-Ribbon or Controller for Automatic Typographic Machines, of which the following is a specification.

The invention relates to machines for making controllers for typographic machines, which produce composed matter automatically in accordance with the indications of the controller as it passes through the machine, although in certain of its aspects the invention relates also to other kinds of controller operated or controlled machines.

More particularly the invention relates to machines which by keyboard manipulation by an operator places on or in a controller strip indications or marks representing a composition in such manner that the corresponding composed matter will be automatically produced by the typographic composing machine. A machine of this kind, by way of example, is illustrated in the application of Charles T. Moore, Serial No. 76,783, filed September 27, 1901. My invention, so far as concerns certain of its features may also be used in connection with machines for making cast type bodies or matrices. In such apparatus a controller strip or ribbon, usually of paper, is marked to represent type characters, letters, words, punctuation marks, numerals, etc. These marks occupy different positions on the strip corresponding to the character represented. When the strip so marked is fed through the typographic apparatus its marks control the working of the same and cause it to print the characters signified by the marks. In other words, the printing or typographic apparatus interprets the marks and translates them into type impressions. Besides type character marks, the strip is provided with other marks which represent and control the operation of the typographic apparatus to enable it to perform spacing and other operations and to govern its movements generally.

An object of the present invention is to provide an improved controller strip or ribbon marking apparatus.

Further objects of the invention are to provide other devices and novel mechanisms for coöperating with and rendering conjoint service with the marking apparatus in making the controller; to provide such devices adapted to make a controller in which a plurality of character indications are arranged along a single transverse line of the controller; to provide for line feed of the controller at proper points to correspond with the arrangement of types or type carriers in the typographic machine; to provide for such control of the sequence in connection with a non-traveling controller marking mechanism; to provide for all the foregoing in the production of a controller for a typographic machine having a type carrier traveling in one direction only; also in producing a controller in which a single mark represents a character in the typographic machine and further with a plurality of character representations on a single transverse line of the controller; to provide for all the foregoing in making a controller in which the character perforations are perforations in the controller strip; to provide novel perforating mechanism and actuating means therefor; to provide for delayed action of one key stroke in perforating the controller in connection with such mechanism. These and other objects of invention not specifically set out above will in part be set forth hereinafter and will in part be obvious to those skilled in the art.

The invention consists in the novel parts, constructions, arrangements, combinations and improvements herein shown and described.

The machine herein described is adapted to be used with the justification apparatus described in the application above referred to. It is therefore not necessary to describe the justification apparatus in this specification, nor to illustrate it in the accompanying drawings, except so far as will make plain how and with what parts of the present invention it coöperates.

The accompanying drawings referred to herein and forming a part hereof, illustrate one embodiment of the invention and with the specification illustrate the principles of the invention.

Of the drawings: Figure 1 shows a plan view of the machine; Figs. 2 and 3 are enlarged sectional views showing the hammer and key action and ribbon-marking devices; Fig. 4 is an enlarged detail view showing an entire key-lever and its connections with the hammer and unit-counting mechanism; Figs. 4ª and 4ᵇ are detail views of a stop pawl and the lower portion of a hammer; Figs. 5 and 6 are detail views, partly in section, showing the unit-counting mechanism; Figs. 7 and 8 are side and front views respectively of the shift keys and shift mechanism; Fig. 9 is an end elevation of the machine as viewed from the left of Fig. 1; Fig. 10 is an enlarged plan view of the keyboard of the machine, parts being broken away to show the arrangement of the unit-counting wheel; Fig. 11 is a detail perspective view on an enlarged scale showing the position and operation of the unit counting and storing mechanism, and the operation of the "correction", "justification" and "finis" keys; Figs. 12 and 13 are front elevation and plan views respectively, showing the relative arrangements of the sequence counter and its actuating means, and the stop pawls; Fig. 12ª is a detail view of the sequence counter; Fig. 14 is a horizontal sectional view of the cylinder and valve mechanism for actuating the sequence counter, said cylinder and valve mechanism being shown in elevation and plan respectively in Figs. 12 and 13, at the right; Fig. 15 is a vertical sectional view of a portion of the unit registering or storing devices; Fig. 15ª is a detail view of the right pin-carrying arm shown in Fig. 15; Fig. 16 is a detail view showing in front elevation (parts being shown in section) the unit registering or storing mechanism; Figs. 17 and 18 are detail elevation and plan views respectively, of the unit storing or registering mechanism and the justification setting mechanism shown at the right of Fig. 1; Fig. 19 is a detail perspective view on an enlarged scale of the upper portion of the machine showing one of the hammers in position, the punches, and ribbon or strip feeding mechanism—the view being taken from the left of Fig. 1; Fig. 20 is a detail of the ribbon feed escapement lever and its actuating or tripping device; Figs. 21, 21ª, 21ᵇ are perspective plan and side elevation views respectively, of the stop pawls for the shift case; Figs. 22, 23 and 24 are side, rear elevation and plan views respectively, of the ribbon feeding mechanism; Fig. 25 is a detail perspective view of the justification setting mechanism; Fig. 26 is a side elevation of the justification lever, partly in section, the section being taken on the line $x$—$x$ of Fig. 27, looking in the direction of the arrow; Fig. 27 is a vertical sectional view taken on the line $y$—$y$ of Fig. 26; Fig. 28 is a vertical sectional view of the justification setting mechanism and rack-actuating devices shown at the right of Fig. 25, said section being taken on the line $z$—$z$ of Fig. 29; Fig. 29 is a longitudinal vertical section of the justification setting mechanism shown in Fig. 25; Fig. 30 is a view showing a portion of the ribbon made by the machine described herein and representing the sentence "The perforations shown here will govern the printing machine"; Fig. 31 is a portion of the justification ribbon corresponding to the ribbon shown in Fig. 30, illustrating the action of the justification mechanism as controlled by its setting mechanism forming part of the present invention; and Figs. 32 to 36 inclusive are portions of the justification ribbon showing different amounts of justification.

Referring to the embodiment illustrated by way of example in the accompanying drawings, the description of various component parts of the machine have been placed under various captions or headings as a matter of convenience in understanding and referring to the machine, but it will be understood that such arrangements and captions are not restrictive in character. The machine herein shown and described produces a controller such as is produced by the machine shown in the application Ser. No. 130,459 of Charles T. Moore, filed on or about November 7, 1902, and is shown having means and connections for coöperating with and controlling a justifying mechanism, such as is shown in said application.

*The ribbon marking mechanism.*—In the machine embodying my invention I have shown punches as the ribbon-marking devices and perforations in the ribbon as the marks; but it is not to be understood that the invention is limited to perforations. Any suitable mark which is of a character to cause the various parts of the typographic apparatus to perform their functions may be employed; such for instance, as indentations, cuts or slits.

The invention in accordance with one of its features provides a non-traveling controller marking mechanism, and in the embodied form thereof there are comprised a series of stationary punches and dies corresponding to the several typographic characters and functions, and actuating means which actuate the punches in accordance with the designations of the operator at the keyboard.

In accordance with one feature of the invention, there are provided a series of strikers or hammers corresponding to the punches and dies, with selecting means operated by the keys to select the punch and striker corresponding to an actuated key. Coöperating therewith, as provided by the invention in one aspect thereof, as will be later described in more detail, are means for designating or controlling the arrangement of the marks or perforations on the controller in transverse lines to correspond with the operation of the typographic machine to be controlled by the controller. A line feed for the controller is provided which operates to feed the controller whenever the order of characters as they occur in the composed matter, though not necessarily, sequentially, departs from or breaks the sequence of characters on the type carrier of the typographic machine.

The punches or ribbon-marking devices are represented in the drawings (see Figs. 1, 2 and 3) by the numeral 1. They are arranged in a horizontal series and reciprocably mounted in suitable guides 2, 2'. Each is surrounded by a spring 3, working between the frame of the machine and a collar fixed on the punch to return the same to normal position after it has been struck by its hammer 4. The punches in perforating the controller work through a die-plate 5 in front of which is fed the ribbon 6. Each punch corresponds to a type-character or to some function of the typographic apparatus, and is represented by a key in the keyboard. A series of hammers 4 is mounted in front of the punches, and each hammer corresponds to a key in the keyboard so that when a key is struck, a hammer and punch are operated and a mark or perforation is made in the ribbon. The embodied form of actuating means for the hammers 4 will be later described.

In order to collect the punchings or "chips" cut out of the ribbon by the punches, there is provided a box 136 extending below the die-plate to catch the chips. The lower end of this box is connected to a conduit 137 to conduct the chips to a suitable place of discharge (see Fig. 2).

*The ribbon or strip-feeding means.*—The ribbon 6 (see Fig. 30) is provided with a series of perforations *s* along its margins, which are engaged by the sprocket teeth 7ª of the feed-roll 7 (see Figs. 2, 9, 19, 20, 22 and 23). The movement of said feed-roll is controlled by means of an escapement wheel 67 and escapement lever 66, and said feed-roll is caused to rotate, on being released by the escapement lever, through the medium of a belt-pulley 125 on one end of the feed-roll shaft, connected by suitable friction driving connection to a source of power. The escapement lever is actuated by the sequence controller or counter 8 (described in detail with its coöperating parts at a later point) when it reaches the end of its travel, through the following mechanism: In the stem of the escapement lever is mounted a spring latch 127, normally holding the escapement lever in the position shown in the drawings, against the action of its spring 66ª by the engagement of said latch with a stop-lug 128 arranged in its path when the latch is in its extended position. Below the escapement lever and in line therewith is mounted a finger 129 suitably guided in a bearing attached to the machine frame. The upper end of said finger is provided with a spring joint abutting against latch 127 of the escapement lever, and also engaging stop-lug 128. Suitably supported in bearing arms depending from the top plate C of the machine is a spring-mounted rock-shaft 130, having fast thereon an arm 131 arranged directly below finger 129. Near the other end of the rock-shaft is another arm 132, extending downwardly and in the path of the sequence counter 8 at the end of its travel toward the left.

The operation of the above-described parts is as follows: When the sequence counter strikes arm 132, shaft 130 is rocked, and arm 131 projects finger 129 upwardly, thereby pressing back latch 127 free of stop-lug 128. As soon as latch 127 is free of lug 128, escapement lever 66 is rocked by spring 66ª thereby releasing escapement wheel 67, allowing the same to rotate and with it the ribbon feed-roll 7, thus feeding the ribbon forward. The escapement of wheel 67 can be of only one tooth at each operation of the rock-shaft 130, the forked end of the escapement lever being so formed that as the teeth on the escapement wheel pass the front limb of said lever after it has been rocked by its spring 66ª, said teeth cam the lever back into position to catch the next tooth of the escapement wheel and hold the same until the next trip of the sequence counter and operation of rock-shaft 130. The spring joint 129ª of the finger 129 insures the return of the escapement lever to position to catch the next tooth of the escapement wheel after each operation of the parts, even should the finger not drop out of the path of the latch 127 on its return movement. Should finger 129 happen to stick in its upper position, no harm would result for the reason that the latch would press the spring joint out of its path as it moved back, and after it had passed over said latch would cam it down into position as it was brought forward against lug 128,—the end of spring joint 129ª being beveled for that purpose.

A manually operated ribbon-feeding means is provided for feeding up the ribbon to examine the perforations, or preparatory to severing a length of perforated ribbon, or for other purposes. Such means consist of a finger key 133 on one arm of a bell-crank 134 pivoted on the under side of top plate C. The other arm of said bell-crank is in position to engage an arm 135 fast on rock-shaft 130. By striking key 133, rock-shaft 130 is operated and through it the escapement mechanism is actuated to cause a feed movement of the ribbon feed-roll 7.

A ribbon-severing device, consisting of a rotary cutter 195 (see Fig. 19) carried in a slide 196 sliding on ways in rear of the feed-rollers. Said cutter is formed with a pinion 197 on its shaft engaging a rack 198 adjacent the ways, on which the slide 196 moves. By sliding the slide 196 along its ways, cutter 195 is rotated and severs the ribbon which passes beneath it.

*The key action.*—As embodied in the illustrated machine, the key and hammer action includes that feature of the invention by which when a key is operated in the key board the corresponding perforation in the controller is not made until the depression of the next subsequent key, to give opportunity for the correction of erroneous key strokes without necessitating alteration of the controller. So far as concerns other features of the invention, however, the key action may be organized and operated without this "delayed action" feature. As embodied, the hammers 4 (see Figs. 3 and 4 of the drawings) are loosely pivoted upon supporting rod 9 running the width of the machine. There is a hammer for each key in the key board except the justification and correction keys. While the finis key has no perforating punch corresponding to it, yet it is provided with a blank-punch and spring-hammer in order that the touch on all the keys may be uniform. Each hammer is provided with a weighted end 12 which, in normal position, is held out of the direct vertical line of the pivotal support of the hammer. This brings the center of gravity of the hammers out of the vertical lines passing through their points of support, so that when the pawl 11 is released from the notch 10 the hammer will instantly fall by the attraction of gravity upon its weighted end 12. The fall of the hammer is assisted and accelerated by means of a spring 13 engaging a pin 14 projecting from the side of the hammer, the other end of said spring being attached to a rod running throughout the width of the machine. The pawls 11, one for each hammer, are pivoted upon a rod 15 extending the width of the machine, and are maintained in locked position with the hammers by means of springs 16 respectively, one end of which is hooked to the pawl and the other end is attached to a bar 17 projecting from the frame of the machine. Means are provided for giving a yielding or springing action for the keys in actuating the hammers, and as embodied, attached to the lower edge of each of said pawls is a spring 18, with which the key lever contacts to release the hammer. Also each pawl is provided on its upper edge with a stop-lug 19, the purposes of which will be hereinafter described.

The stop-lugs of adjacent pawls are arranged in staggered relation so that on looking the length of the line of pawls two lines of stop-lugs would be seen. The forward end of each pawl is formed in such shape as to engage with and retain its hammer 4 in normal upright position, and is also formed with a cam surface 20 fitting a similar cam surface 21 on its hammer (see Figs. 2, 4 $4^a$ and $4^b$). Key-levers $1^x$ are arranged below the hammers and stop-pawls and are pivoted upon a rod 22 extending the width of the machine and supported from the frame. The inner ends of the key-levers are formed with an upturned projection 23 and a lug 24. Projection 23 is arranged to engage spring 18 on the pawl 11, and lugs 24 engages a bail-rod 25 carried by arms 26 on rock-shaft 27. The bail-rod 25 is arranged immediately below an elbow 30 (as shown in Fig. 4) formed on the hammers.

By the above arrangement, all the hammers being in normal position, upon depression of a key-lever $1^x$ the upturned end 23 of the key-lever engages spring 18 of the pawl, and when the action of said spring is overcome the pawl is raised by the continued motion of the key-lever out of engagement with the retaining notch 10 of the hammer. The hammer immediately drops against a rest $4^x$ of wood or other suitable material, under the influence of gravity and the pressure of spring 13. Pawl 11 is held in raised position by the engagement of its end with shoulder 31 on the lower end of the hammer, whereby the stop-lug 19 of said pawl is held in elevated position to arrest the sequence counter in its travel. Upon the depression of another key, the previously released and dropped hammer is first thrown upwardly by the engagement of the bail-rod 25 with the elbow 30 thereof, and with sufficient momentum to strike its punch 1, causing it to record upon the ribbon the mark or perforation representing the character signified by the key previously struck. In its motion upward the hammer engages the pawl 11 by its cam surface 21 and compels said pawl to enter the retaining notch. At the same time, and during the continued movement of the second-depressed key-lever to complete its stroke, it engages the spring 18 of the pawl in line therewith and releases its corresponding hammer. It will thus be seen that upon depression of a key, the hammer corresponding thereto is caused to fall, and upon the depression of another key, the fallen hammer is returned and its punch operated, while at the same time the hammer corresponding to the second-depressed key is allowed to fall. The punch therefore corresponding to an operated key is actuated upon the operation of a succeeding key. The action is the same when the second stroke is on the same key. By the operation of cam-surfaces 20, 21, on the respective pawls and hammers, the pawls are compelled to drop into retaining notches of their corresponding hammers. A hammer cannot reach its punch without at the same time depressing its pawl; so that a perfect interlocking key action is provided. The punches cannot be operated, and the sequence counter cannot move without the pawl engaging its hammer notch and being depressed out of path of the sequence counter.

The above-described stop-pawl and hammer mechanism insures that the repetition of a character shall be represented on a new transverse line on the controller ribbon. The forward feed movement of the controller ribbon being caused by the sequence counter 8 operating escapement lever 66, through rock-shaft 130, as above explained, the key action and the action of the stop-pawls is such that when a character is repeated the sequence counter is permitted to move to the end of its travel to operate the ribbon feed mechanism between each repeated key operation. On depression of the key for the first of the repeated characters, the stop-pawl 11 corresponding thereto is thrown up, releasing the corresponding hammer and permitting it to drop. The stop-pawl then rests on the shoulder portion 31 of the hammer and is thereby held in raised position so as to be in the path of the sequence counter and arrest the same. On again striking the same key to repeat the character, bail-rod 25 engaging the elbow 30 throws upwardly the hammer which strikes the punch and perforates the ribbon. In its upward movement the hammer cams down the stop-pawl 11 out of the path of the sequence counter, whereupon the sequence counter moves to the end of its travel and operates the ribbon feed mechanism so that the ribbon is fed forward one space. After having moved up to strike the punch and cam down the stop-pawl, the hammer will drop back because the stop-pawl will be thrown upwardly by the action of its spring 18 against the up-turned end 23 of the key-lever. The sequence counter will be arrested at the same stop-pawl, and the next succeeding key stroke will throw up the fallen hammer to punch the second of the repeated characters on the new line of the ribbon presented to the punches by the above described feed movement. The action of springs 18 on the stop-pawls and the coöperating cam surfaces on the stop-pawls and hammers insure the proper working of the stop-pawls and hammers so that the sequence counter will operate the ribbon feed mechanism to cause repetitions of characters to be made on separate transverse lines of the ribbon. No matter how fast the key operation may be it is impossible to perforate the ribbon without the stop-pawls, hammers and sequence counter performing their functions as above described. This will be readily seen from an examination of these parts. The hammers and stop-pawls are so shaped that a hammer cannot reach a punch to strike it without camming down its pawl. The camming down of a pawl releases the sequence counter. The pawl will be cammed down even though the next key stroke follows so rapidly that the key-lever has not had time to recover its normal position,— the spring 18 on the pawl yielding to its downward movement should the upturned end of the key-lever not have returned to normal position by reason of the finger pressure not having been removed from its key.

*The unit counting and storing mechanism.*—As in nearly all typographic machines such as are controlled by controllers the product is in justified lines, in the present machine provision is made for counting and storing the units of each successive composed line. The embodied form of said mechanism is best shown in Figs. 4, 5, 6, 9.

The portion of the key-levers represented in these figures is forward of the key-lever pivots 22. Below the forward end of the key-levers is arranged a ratchet-wheel 32, each tooth of which corresponds to a space unit. Said ratchet wheel is mounted fast on and midway between the ends of a shaft 54 running the width of the machine; its relative position being illustrated in Figs. 4, 10 and 11 of the drawings. Pivoted on a shaft $32^a$ adjacent said ratchet-wheel are a series of cam-levers $32^b$, one for each of the character-keys. Extending upwardly from the ratchet-wheel shaft and free to swing thereon is an arm 33, near the upper end of which is pivoted a spring-pawl 34 engaging the teeth of the ratchet-wheel. Arm 33 is connected through a spring 35 from its upper end to a suitable stud 36 on the frame of the machine. Each of the cam-levers $32^b$ is provided with a cam slot 38 in which is engaged a bail-rod 37 (see Fig. 11). Said bail-rod 37 is carried by arms $37^a$ on loosely mounted sleeves $37^b$ on shaft 54. Bail-rod 37 is in two members, one each side of the ratchet-wheel, so that the tendency to twist and warp which would occur if the bail-rod were in one long member is thereby avoided. The inner end of each member adjacent the ratchet-wheel is engaged by the pawl-carrying arm 33. The forward end $32^x$ of said cam-lever $32^b$ is limited in its downward movement by a space-unit gage 39 to be hereinafter described.

The cam-levers $32^b$ are connected to their respective key-levers by rods 40, the lower ends of which are slotted to embrace the cam-levers $32^b$. Each cam-lever is provided with an aperture 41 at a point in line with said rod 40. The connection between a key rod 40 and its cam-lever $32^b$ is as follows: A small ring is inserted horizontally in the opening 41, the slot of the key rod 40 is then threaded over the cam-lever 32 and through the ring 42; the lower end of the slot is then closed by means of a pin 43. By this means I secure a free joint between the rods and the cam-levers, permitting vertical play in the slot while at the same time maintaining in vertical relation with each other the key-levers and their corresponding cam-levers, so that the downward thrust of a key-lever is always transmitted in a direct vertical line to its cam-lever and no side play occurs. The key-rod 40 is surrounded by a spring 44, the upper end of which is attached to a pin, as shown, and the lower end of which rests against a collar 45 sliding on said rod. Below the forward ends of the cam-levers 32$^b$, as shown in Figs. 4, 5, 6 and 11, is arranged the unit-gage 39 provided with a series of vanes 39$^x$. The gage is shown as having five vanes corresponding to five different cases or "faces" of type. Each vane is provided with stops in the form of notches of varying depths corresponding to the unit value of the letters or characters in the character face represented by that vane. The depth of the notch below a given cam-lever 32$^b$ corresponds to the space units represented by the key-lever connected with said cam-lever, so that the amount of movement of the cam-lever 32$^b$ in a downward direction corresponds to the unit value of the character represented by its key-lever. The cam levers 32$^b$ thus act as interponents between the keys and the unit gage.

Upon the depression of a key-lever its downward movement is transmitted through rod 40 to its cam-lever 32$^b$, which in turn, by means of its cam-slot 38, swings bail-rod 37 and arm 33 a distance sufficient to cause pawl 34 to move over and to drop back of as many teeth on ratchet-wheel 32 as there are units in the character on that key. This distance is regulated by the depth of the notch in unit gage 39 presented to the end of the cam-lever 32$^b$. Further depression of the key-lever simply compresses spring 44. Upon the key being allowed to return, arm 33 is caused by spring 35 to return to its normal position, carrying ratchet-wheel 32 around by means of pawl 34. In all keys representing less than the maximum number of units the extra downward motion of a key-lever is permitted by the compression of spring 44. Ratchet-wheel 32 is thus rotated by an amount corresponding to the unit value of the characters as their corresponding keys are struck.

The slots 38 of the cam-levers 32$^b$ embrace bail-rod 37 so that on the downward movement of a cam-lever said bail-rod is swung through an amount corresponding to the amount of downward movement of the cam-lever as limited by the depth of notch in the unit-gage. The lower end of the upper edge of said slot engages bail-rod 37, as shown in Fig. 5. The lower edge of said slot is of a length just sufficient to engage the bail-rod when the cam-lever is depressed the amount for a character having the minimum unit value; and the depth of said slot is such that the cam-lever may be depressed by an amount permitted by the deepest notch in the unit-gage,—i. e. an amount corresponding to a character having a maximum unit value. This construction of the cam-levers presents important advantages in connection with the movement of the unit ratchet-wheel 32 hereinafter explained.

The end of pawl 34 is beveled off at an angle to cam said pawl down into the teeth of ratchet-wheel 32 when the pawl brings up against stop 46 (see Figs. 4, 5, 6 and 11), the end of which is so shaped as to force pawl 34 into full mesh with the ratchet-wheel. By this means no jumping of the pawl can occur and no overthrow of the ratchet-wheel can take place. The notch to which pawl 34 is carried by the downward movement of a cam-lever, and which marks the unit value of the character corresponding to depressed cam-lever, will be brought to rest at the stop 46 without possibility of failure or slipping, no matter how quick the return movement of the pawl may be made by the tension of spring 35. This is an important feature for the reason that if any jumping of the pawl or slipping of the ratchet-wheel occurred the counting of the units would be deranged and proper justification could not be made.

The slot 38 in the cam levers 32 also serves an important function in insuring correct counting of the units, no matter with what degree of force a key may be struck. As above explained, the lower side of said slot is of a length sufficient to engage bail-rod 37 when a key for a character having the minimum unit value is struck. The cam-lever being stopped in the notch of the unit gage, bail-rod 37 cannot be overthrown on account of its engagement with the end of the lower side of the slot, and arm 33, which is swung by the bail-road and carries pawl 34, cannot be overthrown to cause said pawl to move over too great a number of units.

When a key representing a character of the maximum number of units is struck, bail-rod 37 is arrested by the end of the slot 38, as shown in Fig. 6.

In order to insure the locking of ratchet-wheel 32 to prevent any dragging of the same by the movement of pawl 34 in its back movement, a spring lock pawl 34$^a$ is provided to engage ratchet teeth formed on the side of ratchet-wheel 32 (see Fig. 11). This pawl permits the movement of ratchet-wheel in a forward direction only and prevents any return movement. It will thus be seen that ratchet-wheel 32 is provided with automatic safety means which effectually prevent any improper movement of said wheel and insure its correct movement in accord with the unit value of the characters as determined by the notches in the vanes of the unit-gage.

Means are provided by the invention for storing or recording the successive units of a line for use in justifying the line, as previously indicated. The storing mechanism coöperates with the justification mechanism to automatically set the latter to mark the controller in the requisite manner to produce justified lines in the typographic machine. In the embodied form, units counted on ratchet-wheel 32 require to be stored or registered so that the total unit value of each line of typographic matter may be represented and ascertained to enable proper justification to be made.

The unit storing mechanism is shown in Figs. 11, 15, 15ª, 16, 17 and 18. Upon the end of the shaft 54 upon which ratchet-wheel 32 is rigidly mounted, is a collar 55, extending from which is an arm 56 carrying at its extremity two spring-mounted pins 57, 57'. Said collar is free to slide upon said shaft longitudinally, but is in engagement therewith by means of a spline or feather so that the shaft and the collar with its arm rotate together. Adjacent said collar and loosely mounted upon the shaft 54 is a disk 58, around the periphery of which is a double line of holes 59. Said disk carries securely attached thereto a gear 60. Said gear meshes with a pinion 61 adjacent thereto and suitably mounted upon laterally adjustable supporting brackets 61ª. Pinion 61 engages with the unit storing rack 62. The number of holes around the periphery of disk 58 is equal to the number of teeth in ratchet-wheel 32. These holes are arranged in two rows and the holes of one row come opposite the intervals between the holes of the other row, so that a radial line on said disk intersects but one of the holes. The spring pins on arm 56 are so placed as to engage the holes in the disk. When one of the pins on said arm enters a hole in the disk, the other pin is depressed into its socket against the action of its spring. By arranging the holes in two rows and providing two engaging pins therefor, a much smaller disk is required to accommodate the number of space-units necessary to make up the length of a line.

Upon the actuation of a key through the mechanism before described, ratchet-wheel 32 is caused to rotate an amount equivalent to the value of the character represented by the depressed key. Arm 56 being in engagement through one of its pins 57, 57' with the disk 58, said disk is rotated by the same amount as the ratchet-wheel,—that is by an amount corresponding to the unit value of the character represented by the operated key. This amount of rotation is transferred to rack 62 through the medium of the gear and pinion 60, 61. The rack 62 is moved against constant air pressure in a cylinder 98 through its connections with the piston-rod 99 of said cylinder, as shown in Fig. 17. At each key operation the units are cumulatively stored or registered on the rack, and the total amount of movement of said rack will represent the total units occupied by the matter contained in an unjustified line. The direction of movement of the rack is indicated by an arrow on Fig. 18, and is toward the justifier rack 180.

An alarm mechanism is attached to the machine and set to give notice to the operator when said unit storing rack has been moved to within a certain number of units of the limit of its movement, which number is sufficient to allow the addition of another word or a division of a word; or to indicate to the operator that he must operate the justifying mechanism.

In order to enable the length of line which the apparatus will make to be adjusted, that is, to give the desired page or column width in the typographic machine means are provided at the end of the rack 62 to set said rack to the length of line desired. These means consist of a scale 101 having graduated notches along its edge arranged above the end of said rack-guard or cover 101ª. A stop-stud 101ᵇ is adjusted in the desired notch representing the desired length of line and limits the movement of rack 62. The numbers on the scale may be made to represent units or "ems" as desired.

On the completion of a line of matter it becomes necessary to restore the unit-storing rack to its initial position in readiness for a new line. This is accomplished by the "Finis" key 102 through the following mechanism: A spring mounted rock-shaft 109 is mounted in suitable bearing brackets on the base plate of the machine (see Figs. 17 and 18). Fast on said rock-shaft and near the inner end thereof is a bell-crank 104, the horizontal arm of which is directly below the stem 103 of the finis key, and the vertical arm 104ª of which is yoke-shaped at its upper end and engages collar 55 of pin-carrying arm 56. Near the other end of said rock-shaft 109 and fast thereon is mounted a vertical arm 117 having a pin 118 projecting from its upper end and in position to be engaged by a spring-catch 115 pivoted on a post 116 rising from the base plate of the machine. These parts operate as follows:

The total number of units for any line having been stored on the rack, as above described, and the justification mechanism having been set (as hereinafter described) by the operation of justification lever 85, finis key 102 is depressed, the stem of which rocks bell-crank 104, which, by its vertical arm 104ᵃ withdraws the pins 57 from the disk, thus freeing the disk and permitting rack 62 to return to initial position under the influence of the fluid pressure in cylinder 98. When bell-crank 104 is rocked, shaft 109 is also rocked, and with it arm 117, the pin 118 of which passes under and is retained by catch 115. By this means pin-carrying arm 56 is retained out of engagement with disk 58, and the latter is free to be returned to initial position by rack 62.

After striking the finis key the operator next strikes the justification key 140 to throw in gear the justification mechanism. This is accomplished by the stem 141 of said key striking a bell-crank 142 pivoted on the base-plate of the machine. A connection 143 from said bell-crank operates a clutch device to throw in gear the justification mechanism as in the machine described in the application of Charles T. Moore above mentioned.

On the stem 141 of the justification key is fastened an arm 144 in position to engage the spring catch 115 after the end of stem 141 has operated bell-crank 142 to set the justification mechanism in motion. Arm 144 trips catch 115 and thereby releases arm 117, and rock-shaft 109 under the influence of its spring returns pin-carrying arm into engagement with the disk in readiness for the new line.

*The correction mechanism.*—In connection with the above described unit-storing mechanism is provided means for making corrections when a wrong key is inadvertently struck by the operator. It will be remembered that when a character key or the space key or the line key is struck, the corresponding perforation is not made until the succeeding key stroke; but the units are counted for a character or space key when the key stroke is made. When therefore a wrong key is struck the perforation representing it is not made, but its unit value is counted. The following means enable the operator to count out or withdraw from the count or register of the units the number of units occupied by the wrongly struck key character, and thus to preserve and store a correct count of the unit value of a line and prevent wrong justification. A correction key 113 is provided in the keyboard, the stem of which is arranged to strike an arm 114 projecting laterally from a rock-shaft 105 mounted on suitable bearings on the base-plate of the machine (see Figs. 16, 17 and 18). To the other end of rock-shaft 105 is fast an arm 123ᵇ, the upper end of which is yoke-shaped and engages a collar 96 slidable on a hollow stub shaft 97. This hollow shaft is in line with and forms an end bearing for shaft 54ᵇ (see Fig. 15). Formed on collar 96 is a pin-carrying arm 123 similar to pin-carrying arm 56 and having a pair of spring pins engaging the perforations in disk 58 in a similar manner to pins 57, 57'.

Pin-carrying arm 123 is free to swing on shaft 97 by means of its collar bearing thereon. The amount of swing permitted to arm 123 is limited by adjusting screws 125 threaded in arms of yoke 94 (Fig. 15ᵃ) arranged on either side of said arm. Screws 125, 125, are adjusted so as to permit a swing of arm 123 equivalent to one unit—that is, the angular distance between successive perforations in disk 58. A spring 123ᵃ bears against arm 123 and keeps it in contact with the rear adjusting screw 125, as shown in Fig. 15ᵃ. Rock-shaft 105 has also fast thereon a vertical arm 106, to the upper end of which is pivotally connected a link 119, the outer end of which is provided with a slot 120 and a lug 122 (Figs. 11 and 16). Slot 120 engages a pin 121 projecting from arm 117, and lug 122 is in position to engage the end of catch 115, and raise said catch out of engagement with pin 118 on arm 117.

The above-described correction mechanism acts as follows: When a wrong key is struck and its units counted and stored, the hammer corresponding thereto will have fallen. The operator then slowly depresses the correct key which he should have struck on the previous stroke. By depressing the proper key slowly, the fallen hammer of the wrong key is returned, but without sufficient force to strike its punch and make a perforation. Said hammer is held in upright position by its stop-pawl. The operator then ascertaining the unit value of the character whose key was wrongly actuated, strikes the correction key 113 a number of times equal to the number of the space units of the character whose key was wrongly depressed. At each operation of the correction key, rock-shaft 105 is rocked, thereby withdrawing the pin of arm 56 from disk 58 through the medium of link 119 which pushes arm 117, rocks shaft 109 and arm 104ᵃ of bell-crank 104. Just before the pins 57, 57' are fully withdrawn from disk 58, a pin of arm 123 enters a perforation in the disk. As soon as arm 56 is completely free from the disk, said disk is caused to rotate backwardly by the rack 62 under influence of its fluid pressure connection. Said disk can only return an amount equivalent to one space unit, since the movement of arm 123 is limited to that extent by adjusting screws 125. On release of the correction key the parts are returned to normal position by means of the spring on rock-shaft 109. Arm 56 is returned into engagement with disk 58, since lug 122 on link 119 prevents catch 115 from engaging pin 118 on arm 117. By the slot engagement of link 115 with arm 117, said arm is free to swing when shaft 119 is rocked on depression of the finis key without affecting the correction mechanism. To count out the units of any character the operator will strike the correction key as many times as there are units in the value of that character. In order to determine quickly what the unit value of any character is, a plate 112 is provided (see Figs. 2, 3, 4 and 9) on which is represented the unit values of the characters whose hammers are immediately in front of it. When a key is struck, the hammer corresponding thereto falls and reveals at a glance the unit value of the character corresponding thereto.

*The justification setting mechanism.*—In the embodied form of means herein embodied and illustrated, as the units are stored on rack 62, said rack moves backwardly until its end comes in contact with rack 180 in line therewith. When this occurs the operator knows that the units stored amount to a certain predetermined value less than the total unit value of the length of justified line which the machine is set to make. In order that the operator may be notified when the stored units amount to this predetermined value, a suitable warning — either visual or auditory—may be operated when rack 62 contacts with rack 180. The point at which the alarm or warning is set to operate is adjusted so that the operator may determine whether there is sufficient space left in the line to complete a word, or whether to hyphenate and place part of the word in the next line, or whether to fill out the line by justification. This point, at which rack 62 is set to intercept rack 180, may be at any desired number of units short of the total unit value of the justified line the machine is adjusted to make. It has been found that a point thirty-two units short of the full length of line serves all purposes and allows of completion of the line and rack 62 is adjusted accordingly. A set screw 180ª is provided in the end of rack 180 so that the point at which it intercepts rack 62 may be adjusted accurately to come at a complete or whole number of units and not at a fraction of a unit.

When a line is ready for justification, the justification setting mechanism is operated to give the proper amount of justification. This is accomplished by the following means: Justification lever 85 is loosely mounted on a shaft 165 journaled in bearing brackets 166, 166ª secured to the baseplate of the machine at the right hand side thereof. The lower end of the justification lever is formed with a cylindrical case 167 which contains a spring 168, one end of which is attached to the case and the other end is attached to the shaft 165. A ratchet-wheel 169 is secured fast on shaft 165 and a spring-pawl 170 is carried on an arm 171 so as to engage the teeth of said ratchet-wheel. Arm 171 at its lower end is formed with an enlarged hub-bearing and is mounted on a hub-portion 172 formed on the side of justification lever 85, at its lower end. The spring 168 may be wound to the desired tension by means of a suitably shaped tool—such as a screwdriver—inserted in a slot 165ª in the end of shaft 165 and rotating said shaft. The pawl and ratchet prevents unwinding of the spring and retains it in its wound condition. On the side of justification lever 85 adjacent arm 171 is formed a stop-lug 85ª, and on the adjacent side of arm 171 is a similar stop-lug 171ª. These stop-lugs coöperate in a manner hereinafter described.

Pivotally connected with the uper end of arm 171 is a tie-rod 173, the rear end of which is pivotally connected to a stem forming part of a toothed sector 174 loosely mounted on a shaft 175 mounted in bearings 176, 176ª on the baseplate of the machine (Figs. 25 and 28). Mounted on said shaft 175 is a spring case 177, and fast to the hub of said spring case is a ratchet 178. On said spring case is formed a toothed sector 179, proportional to sector 174. Sector 179 engages justification rack 180, and sector 174 engages a setting rack (shown in dotted lines, Fig. 25) for the justification mechanism, which rack passes into and controls the justification mechanism in the same manner as the rack shown in the application of Charles T. Moore before referred to. The movements of the two sectors and racks are proportional and represent one or a whole number of space units. Fast on the hub-portion of sector 174 is an arm 181, carrying at its outer end a spring-pawl 182 in position to engage ratchet-wheel 178. The tail of said pawl, in the normal position of arm 181 is engaged by a post 183, so that the pawl is held against the action of its spring, out of engagement with ratchet-wheel 178. Mounted in suitable bearings on the baseplate of the machine in rear of brackets 176, 176ª is a spring-actuated rock-shaft 184 (Figs. 18, 25 and 29). Loosely pivoted upon said rock-shaft at a point where it will engage ratchet-wheel 178 is a spring-pawl 185. In the tail of said pawl is a pin 185ª projecting from the side thereof, the purpose of which is described below: Fast on said rock-shaft and adjacent pawl 185 is an arm 186 which has projecting from one side of its end a pin 187 which engages under the lower edge of pawl 185. On the inner end of rock-shaft 184 is an arm 188 having pivotal connection at its upper end with connection 143 and therethrough with the finis key. Upon a bracket 189 rising from the baseplate of the machine near pawl 185 is pivoted a spring latch 190, having its tail projecting vertically and in the path of a pin 191 on the rear end of justification rack 180. A bracket 192 rises from the baseplate of the machine and carries in its upper end an adjusting screw 193 which is in the path of and forms an adjustable stop for justification rack 180.

The operation of the mechanism above described is as follows: When all the character and normal space units in a line have been counted and stored by the operation of the character and space keys and the line is to be justified, the justification lever 85 is pulled in the direction of the arrow shown in Fig. 25. This tends to move its stop 85$^a$ away from stop 171$^a$ on arm 171; but spring 168 causes arm 171 to follow the movement of the justification lever. This movement of arm 171 rocks sectors 174 and 179, the former moving the justification setting rack, shown in dotted lines, into the justification mechanism (shown in the application of Charles T. Moore referred to), and the latter moving justification rack 180 a corresponding amount. The amount of movement of these racks and sectors will be determined by the amount of justification which the line requires. If the units required to be added to the line to justify it are equal to or greater than the number of normal word spaces in the line, then the sectors will move until the justification setting rack is arrested by the stop rack in the justification mechanism. Rack 180 does not start to move until sector 174 has moved its rack an amount equivalent to one normal word space and brought it even with the first space-slide of the justification mechanism—this extra movement of the sector 174 and its rack being required by conditions in the typographic apparatus. The loss of movement of rack 180 is accomplished by means of pawl 182, which is held out of engagement with ratchet 178 by the engagement of its tail with post 183. As soon as the movement of sector 174 and arm 181 carries pawl 182 free of post 183, the pawl engages ratchet 178 and moves sector 179 and rack 180 proportionally with sector 174.

If the number of units to be added to the line for justification is greater than the number of normal word spaces in the line, another movement of the justification lever will be necessary, for rack 180 will not have reached stop 193.

On the return movement of justification lever 85, sector 174 returns with it, withdrawing its rack from the justification mechanism; but sector 179 and rack 180 are left in advanced position, where they are held by means of pawl 185 engaging ratchet 178 while pawl 182 slips back over ratchet 178. Repeated movements of the justification lever 85 are made until rack 180 is arrested by the stop 193. When rack 180 is thus arrested by stop 193, the setting of the justification mechanism is complete. Thus rack 180 acts as a controller for setting the justification mechanism.

In the case when the number of units to be added to a line for justification is less than the number of normal word spaces in the line, only one movement of the justification lever 85 is required, for rack 180 will be arrested by stop 193 before the justification setting rack reaches the stop on the stop-rack in the justification mechanism. In its movement rearwardly, justification rack 180 winds up the spring of spring case 177. When the justification has been made in the manner above described, the operator depresses finis key 102, which through connection 143 rocks shaft 184 and arm 186 thereon. Arm 186 through its pin 187 raises the tail of pawl 185 thereby disengaging the pawl from ratchet 178 and permitting the spring in spring case 177 to return rack 180 to initial position. When the tail of pawl 185 is raised, as above described, pin 185$^a$ therein is engaged by latch 190, which holds said pawl out of engagement with ratchet-wheel 178 and permits the full return of the rack. When the rack nearly reaches its initial position pin 191 in the end thereof strikes the tail of latch 190, thereby disengaging the latch from pawl 185 and permitting the latter to resume its engagement with ratchet 178 at the instant the rack completes its return to initial position.

It will be noted that the manual force applied to operate the justification lever does not reach the justification setting mechanism; but that said mechanism is actuated through the medium of spring 168 in the lower end of the justification lever. If only a short movement of the justification racks be required, and one of said racks is arrested before justification lever 85 has been given its full throw, no strain is put upon the justification mechanism or the sectors and racks by the full throw of the lever. All extra pull of the lever is absorbed by spring 168, and stop 85$^a$ will move away from stop 171$^a$ if either of the racks be arrested before the lever 85 has been given its full throw.

In typographic work it is frequently required that the matter be arranged around an illustration, picture or cut, the lines of printed matter being divided, one part situated on one side of the illustration and the other part on the opposite side of the illustration. In order that this may be practicable with the herein described machine, I have provided a special key marked "7$^u$" (Figs. 1 and 10). When it is desired to leave a space in a series of lines of typographic matter for the insertion of an illustration etc., key 7$^u$ is depressed a number of times sufficient to represent the space to be occupied by the illustration. In the machine herein described the key 7$^u$ designates seven units of space, so that if the illustration to be inserted occupy a width of twenty-one units for instance, key 7ᵘ will be depressed three times. It will be understood that the key 7ᵘ is provided with a punch and hammer the same as the other character and function keys in the keyboard, and that a corresponding mark is made upon the ribbon. If the space to be left for the illustration, etc. be not a multiple of seven (or whatever unit value is given to the key 7ᵘ), the space may be increased by the use of the "space" key. The provision of a special space key 7ᵘ is necessary, since the normal space key 200 registers the normal word spaces and controls the movement of the justification ribbon in the justification mechanism, so that the units to be added to a line for justification may be added to the normal word spaces. The key 7ᵘ does not affect the operation of the justifying mechanism, but merely inserts a desired amount of space representation in a line so that spaces may be made without deranging the operation of the justification mechanism.

*The spacing mechanism.*—It will be understood that the justification added to a line is inserted at the word-spaces, that is, the size of the interverbal spaces are varied to effect the justification of the line. Referring to the embodied form, the operator depresses space-key 200 (Figs. 1 and 10) at the completion of every word. A punch is provided for this key and is actuated in the same manner as the punches for the character-keys. The space perforations are clearly shown under the word "Space" at the top of Fig. 30. The normal word space is three units, and three units are counted and stored by the actuation of the space-key. The space-key is in the form of a bar, and is carried by stems 201, 201 (Figs. 10 and 11) pivoted on a bar 202 carried in arms 203, 203 fast on a rock-shaft 204. The lower end of stems 201, 201 are slotted and the slots engage studs 205 (Fig. 11) on the frame of the machine. The key-lever 206 for the space-key has its end arranged beneath bar 202 so that depression of said bar on actuation of the space-key will operate the key action, perforate the ribbon and count the units. The operation of the space-key also causes a feed movement of the justification ribbon in the justification mechanism one sprocket hole in the same manner as in the application of Charles T. Moore hereinbefore referred to (see Figs. 31–36). This is accomplished by means of a connection 207 (Figs. 1, 9 and 10) the front end of which is connected to a bell-crank 208 (Fig. 9) pivoted below the stem of the space-key and actuated thereby and the rear end of which passes into the justification mechanism to actuate the ribbon feeding means therein.

*The shift mechanism.*—As will be seen from the drawings, each character-key represents a plurality of characters. In the machine herein shown and described each character key represents five different characters, and the perforation made by the punch of a character key may represent any one of its five characters. In order that the particular character desired may be represented upon the controller ribbon, shift mechanism is provided whereby any one of the characters represented by a given key may be selected and made upon the strip or ribbon. Since the different characters represented by a single key have or may have different unit values, means are provided by the invention for causing the unit counting and recording mechanism to count and record the proper number of units in accordance with the operation of the shift mechanism. In the embodied form of such means, the unit gage is moved in harmony with the shift mechanism. The unit gage is provided with a number of vanes equal to the number of characters represented by a single key. The unit-gage 39 of the machine herein described possesses therefore five vanes 139ˣ. In order to designate which of its characters a key shall represent, shift keys are provided to make perforations in the ribbon or controller, which shift perforations control the typographic machine to select the particular character or type face intended to be represented by the character perforation succeeding it. These shift keys are shown in Figs. 1 and 10 at the left of the keyboard, and are designated by the numeral 145. Each of these shift keys has a punch corresponding thereto, and these keys operate in the same way to make a perforation in the controller as any of the other keys, except that no units are counted. The perforations made by the shift key punches control the selecting mechanism in the typographic apparatus which selects the type face corresponding to the operated shift key, so that succeeding character perforations will cause the typographic machine to make impressions with the selected type face. Each of the five shift-keys governs the position of the unit-gage so that it will present a corresponding vane with notches of the proper depth to count the units for the particular type face or type case corresponding to said shift-key.

Each shift-key is marked with a designation to indicate which face or case of type it selects and controls. These designations, as shown in the drawings, are U. C. (upper case italics); l. c. (lower case italics); U. C. (upper case roman); l. c. (lower case roman) and s. c. (small caps).

In the illustrated form of unit gage moving means, the gage has its vanes radially arranged, and is given a rotatory movement to bring the desired vane into operative relation to properly control and effect the counting and storing of the units. As embodied, the unit-gage is provided with journaled ends 146, supported in suitable bearings depending from plate B of the machine. At the end below the shift-keys a pinion 47 is secured upon the end of the unit gage (see Fig. 7). Mounted to slide above said pinion is a rack 48, supported in suitable guides depending from plate B of the machine, and having teeth on its lower side in mesh with said pinion. Said rack is provided on its upper surface with teeth in which mesh a series of sectors 49. Each of these sectors is suitably pivoted on brackets depending from the machine frame, and each sector is provided with a laterally projecting stud 50. These studs 50 project from different portions of the sectors—the middle sector having its stud projecting from its lower central portion. The sectors on the right of the middle sector have their studs projecting from portions of the sectors to the right of the center; and the sectors on the left of the middle sector have their studs projecting from different portions of the sectors to the left of their centers. These studs are so arranged in the different positions with relation to the central line of their sectors in order to engage with the notched and cam shaped ends of the stems 147 of the shift-keys. The center shift-key (lower case roman) represents the normal type face or character,—that is, the character most commonly used. In the position of the parts shown in Fig. 7, the character-keys will make representations on the controller ribbon for the normal type face. When it is desired to make a representation signifying a character from another type face, the shift-key corresponding to said type face is depressed. The cam shaped end of its stem will engage the stud 50 of the sector immediately beneath it, and will rock said sector an amount determined by the distance its stud is out of central position. The sector will be brought to rest when its stud is moved to its lowest position and rests in the notch at the end of the shift-key stem. This movement of the sector will carry rack 48 a corresponding distance and will rotate the unit-gage and cause it to present the vane corresponding to the type face represented by the operated shift-key, to the cam-lever. In order to hold the unit-gage in the position to which it is moved, a spring-pin 53 is provided to engage notches 52 on the lower side of rack 48.

With one form of typographic machine adapted to be controlled by the controller produced by the present machine, the shift perforations in the controller are arranged in a transverse line by themselves, and in the illustrated embodiment, mechanism for effecting the requisite feed of the controller strip in connection with the making of the shift perforation is provided. The illustrated form of such means is best shown in Figs. 19, 21, 21$^a$, and 21$^b$. Each of the stop-pawls 11$^a$ of the shift-key levers (see Figs. 21$^a$, 21$^b$) has provided thereon a pivoted finger 148, having a bent end projecting above the top of the stop-pawl and a spring 148$^a$ to press it in advance of the pawl in the direction from which the sequence-counter approaches said stop-pawls. Mounted above the ends of the shift-key stop-pawls so as to slide longitudinally is a comb 149 having notches arranged above the ends of said spring-fingers 148. The end of said sliding comb 149 comes in contact with an arm 150 fast on spring rock shaft 130, before described. The operation of these parts is as follows: Upon depression of a shift-key, its corresponding stop-pawl 11$^a$ is thrown up and its finger 148 enters its notch in the sliding comb 149. At the same time the sequence counter is released and moves to the raised finger 148, carrying it forward in the same direction, and with it sliding comb 149 the end of which strikes arm 150 of rock-shaft 130, oscillating the same and thereby, through the ribbon-feeding mechanism heretofore described, causing a feed movement of the controller ribbon. Upon striking the succeeding character key the shift-key stop-pawl previously raised is depressed by the throwing up of its hammer to punch the shift-key perforation. As soon as said stop-pawl is depressed the sequence-counter moves to the end of its travel and operates the ribbon-feed mechanism in the manner heretofore described to cause a forward feed movement of the ribbon or controller so that the next character perforation may be made upon another transverse line.

Instead of the mechanical means above described for causing the feed mechanism to feed the ribbon or controller forward so that the shift perforation is made on a separate transverse line of the ribbon, fluid pressure means may be provided, as shown in Figs. 22, 23 and 24. Said means as illustrated consists of a spring rock-shaft 151 mounted on suitable bearings 152 rising from the baseplate of the machine. Fast on said rock-shaft are arms 153, carrying in their extremities a bail-rod 154 which extends over the ends of the shift key levers; said rock-shaft 151 is surrounded by spring 155, one end of which presses downwardly upon one of the arms 153. At the outer end of said rock-shaft and fast thereon is an arm 156, the end of which extends to engage a latch-piece 157 pivoted to the upper end of a valve-rod 158, the valve of which controls the admission of fluid pressure to a cylinder 159 in which reciprocates a piston 160. The piston-rod 161 of said piston extends upwardly through a suitable guide 162 to engage an arm 163 fast on rock-shaft 130. Fluid pressure is admitted to said cylinder 159 through a connection 164.

The above described mechanism operates as follows: Upon depression of a shift-key, bail-rod 154 is pressed upwardly against the action of spring 155, and the end of arm 156 is depressed below the notch of latch-piece 157. When the finger pressure on the operated shift-key is removed, its key-lever moves downwardly away from bail-rod 154. The action of spring 155 lifts arm 156, which raises valve-rod 158, admitting fluid pressure to piston 160 and causing its piston-rod 161 to actuate the ribbon-feed mechanism as described. The end of latch-piece 157 is cam shaped and in its upward movement engages a stud 157$^a$ which cams the latch-piece off the end of arm 156, whereupon the valve-rod 158 returns under action of its spring 158$^a$ and the valve closes, thus permitting piston 160 to return under action of its spring 160$^a$ to normal position.

*The sequence counter mechanism.*—It will be understood from the foregoing description that in one kind of typographic machine adapted to be controlled by a controller such as is produced by the present machine, successive characters in the matter to be composed occurring out of the sequence in which the types are arranged upon the type carriers must be placed upon a different transverse line of the composing strip. In other words, the composing strip must be fed forward one line space whenever, in operating the typographic machine, the successive characters to be represented occur out of the sequence of the types on the type-carrier. Means are therefore provided by the present invention for automatically feeding the controller at the proper times or points during the making of the controller dependent upon the order in which the keys are actuated. Said means further comprise devices for permitting the actuation of any desired number of the punches so long as there is no deviation from a predetermined order of sequence without feed of the controller strip, but causing a feed of the controller strip whenever said order of sequence is departed from. The means for accomplishing this I have called the "sequence counter", and the same is illustrated in Figs. 12 and 12$^a$ and indicated by numeral 8. To the sequence counter is attached a rod 63, at the other end of which is attached a piston 84 moving in air cylinder 84$^a$ and controlled by suitable valve mechanism and connections hereinafter described (see Fig. 14). To the opposite end of said rod is adjustably attached the sequence counter itself, carrying on opposite sides thereof spring-mounted pawls 65, 65$^a$. Said pawls are pivotally mounted upon the sequence counter so that their ends normally project below the block with their engaging faces directed in opposite directions, as more clearly shown in Fig. 12$^a$. Said sequence counter is mounted in the machine to reciprocate in suitable guides 65$^c$ above the line of the stop-pawls 11, and the width of the block is such that the sequence counter pawl on one side will be above one row of the stop-lugs 19 (Figs. 4 and 4$^a$) on said hammer-retaining pawls, and the other pawl will be above the other row of lugs. Suitable means are provided whereby the sequence counter is reciprocated, and in the embodied form, fluid pressure means are employed, said sequence counter being traveled by the air pressure in cylinder 84$^a$. The sequence counter is traveled across the line of the hammer-retaining pawls, so that traveling in one direction one of its pawls 65 will be arrested if a hammer-retaining pawl be raised by the operation of a key. The other pawl 65$^a$ will pass over by means of its pivotal mounting any raised lugs of the hammer-retaining pawls which it encounters in the other row, leaving these to be encountered in its return movement, when it will engage said raised hammer-retaining pawls and be arrested thereby. The sequence-counter is thus made to engage the lugs of the raised hammer-retaining pawls of one row in one direction of its travel, and of the other row in the return direction of its travel. Upon reaching the limit of its movement, said sequence counter engages the arm 132 on rock-shaft 130, thereby causing the controller strip to be fed forward by the controller ribbon-feeding mechanism above described, so that at each round trip of the sequence counter the controller strip or ribbon is fed forward for a new line of perforations.

The cylinder and piston for controlling the movement of the sequence counter is shown in Figs. 12, 13 and 14. Said cylinder is mounted on a bracket 69 rising from the frame of the machine. The admission of air to said cylinder is controlled automatically by the movement of the sequence counter itself by the following mechanism: Pivoted to the frame of the machine, as shown in Fig. 13, are two fingers 70, 71. The ends of these fingers are arranged in the path of the sequence counter so as to be struck thereby, and the opposite end of said fingers are pivotally attached to a tie-rod 72. Said tie-rod has at its end a valve 73 controlling the admission of air to the air cylinder through the following mechanism: Said valve 73 controls ports 74, 75 leading from its chamber at each end and to either side of an auxiliary piston 77 in an adjacent cylinder 76. Said auxiliary piston is mounted in and actuates the movement of a frame 78 which carries a valve 79. Valve 79 controls the admission of pressure fluid to cylinder 180

84ª, the fluid entering the chamber of valve 79 through connection 75ª (Fig. 13). Valve 79 controls admission ports 80, 80ª leading from the chamber of valve 79 to either side of piston 84, and exhaust ports 81, 81ª communicating with channels 82, 82ª which lead to either side of piston 84. The exhaust is through either of channels 82, 82ª to the outer side of valve piston 79 and into the atmosphere—the ends of the chamber of valve 79 being open to the atmosphere.

In the position of the parts shown in Fig. 14, pressure is being admitted to the left side of piston 84, and said piston is traveling toward the right, carrying with it the sequence counter. When the sequence counter reaches the limit of its movement it strikes finger 71, which throws valve 73 to its left position (the reverse of that shown in Fig. 14), whereupon pressure is admitted to the left of auxiliary piston 77, which in turn reverses the position of valve 79 thereby admitting pressure to the right of piston 84, whereupon said piston and the sequence counter is driven to the left. Upon reaching its left extremity of movement the sequence counter strikes finger 70, whereupon the position of the valves and auxiliary piston is again reversed and the sequence counter is driven in the opposite direction.

To facilitate access to the various parts of the machine for inspection, cleaning, adjustment or other purposes, the framework is built up of hinged parts which may be swung back to expose the mechanism. The framework consists of a baseplate A, an intermediate plate B, and a top plate C (see Fig. 9). Intermediate plate B is carried upon standards D, D at front and rear, and said intermediate plate is hinged at the rear at E so that it may be swung up to give access to its under side and to the parts below. Spring latches F are provided on front posts D, which take over plate B and lock the same in normal position.

In like manner top plate C is carried on posts G, G rising from intermediate plate B and hinged at the rear at H. The front posts G, G are also provided with spring latches K, K taking over top plate C. The latches K, K are mounted fast on a rockshaft M (Fig. 19) which is provided with a spring N. By these means both latches work together. Latches F are mounted in a similar manner.

In order to illustrate more clearly the operation of the herein described apparatus I have shown in Figs. 30-36 the ribbons or controllers made thereby.

In Fig. 30 is shown the main controller ribbon bearing the marks or perforations representing the characters and functions to control a typographic apparatus and cause it to produce the impressions for the sentence: "The perforations shown here will govern the printing machine."

R indicates the character perforations; s indicates the sprocket holes for feeding the ribbon; L indicates the "line" perforations made by the "line" key; T indicates various shift perforations; V indicates space perforations for the normal word spaces.

The characters at the head of Fig. 30 are the characters represented by the perforations situated in the vertical lines below them—the particular character being determined by the last shift perforation preceding it in the transverse lines above it. These characters at the top of Fig. 30 form a key for reading the ribbon and may be printed on a strip of suitable material such as paper, celluloid etc., and when the printed strip is placed above any transverse line of the ribbon the marks or perforations in that line may be readily read. The characters at the foot of Fig. 30 indicate the order of sequence in which they are arranged on the type-carriers in the typographic machine. The numerals 1, 2 at the right side of Fig. 30 indicate the beginning and ending of a line of the composed matter.

It will be seen upon inspection of Fig. 30 and by means of the key letters at the top and the interpretations given on the right that the ribbon is marked in accordance with the described operations of the machine and a detailed description of all of the marks is unnecessary.

The "line" perforation on the first transverse line marks the end of a preceding line—or in commencing new matter is made before commencing the composition to control certain mechanism in the typographic apparatus. The "line" perforations are shown as differently shaped from the other perforations—in this instance square-shaped—so that they may be readily distinguished. A "space" perforation is next made by depressing the "space" key. This moves the stop rack in the justification mechanism to proper position to commence operation for causing that mechanism to record the normal word spaces. Then two "space" perforations are made which cause the proper indentation to be made by the typographic apparatus for paragraphing. Next the upper case Roman shift-key is depressed and its corresponding shift perforation made to cause the succeeding character perforation —"T"— to represent an upper case Roman character and to control the typographic apparatus so that it will select this character from the corresponding type-carrier. Next, the "small caps" shift-perforation is made by depression of the corresponding shift-key, so that the next character perforation —"H"— will represent this type-face. (The printing of the words " The " and " Perforations " are shown in small caps and italics respectively merely to show the operations of the various shift-keys). Further description of Fig. 30 is deemed unnecessary, as the subsequent marks are made similarly to those above described.

It will be noted that the shift perforations occupy separate transverse lines on the ribbon in each instance; and also that where the characters in the matter to be composed follow in the same sequence as the sequence of type on the carriers—which sequence is shown below Fig. 30—the character perforations occur on one transverse line; and that where this sequence is not followed the characters out of sequence are made on succeeding transverse lines.

Fig. 31 illustrates the justification ribbon made by the justification mechanism (not shown) herein referred to, and is shown merely for illustration and explanation. This strip or ribbon has sprocket holes *f*, whereby it is positively fed through the machine, and justification marks *j* signifying the amount of justification for each line. On this step the numeral 1 signifies the beginning of a line and corresponds with the mark 1 on Fig. 30. This strip or ribbon is fed forward a distance of one sprocket hole for every "space" key operation. There are accordingly represented three sprocket holes beginning at numeral 1 corresponding to the first three "space" marks on the main ribbon, Fig. 30. In the first line of the composed matter, as shown on the drawings, there are seven normal word spaces; and accordingly the justification strip or ribbon is fed forward seven sprocket holes more—one each time a normal word-space occurs and each operation of the "space" key. The amount of justification added is signified by the position of the marks or perforations *j*. In Fig. 32, the position of perforations *j* represent the addition of one unit to each of the normal word-space; in Fig. 33 the position of perforations *j* represent the addition of two units to each normal word-space; in Fig. 34 the position represents the addition of three units, and in Fig. 36 the addition of five units.

Returning to Fig. 31, it will be seen that the perforations *j* represent the addition of two units each (see Fig. 33) to each of the seven normal word spaces, thus showing that it required the addition of fourteen units to justify the line. For the next line no justification was required, since the line comprises only the word "machine".

From the above description it will be seen that the apparatus embodying my invention produces a continuous ribbon or controller bearing all the marks necessary to produce a typographic composition properly arranged with means for spacing, capitalizing, justification, and selecting type of various faces from the various type cases, and that means are provided for making automatically the required amount of justification without requiring any calculation or attention on the part of the operator. All the operations are automatic, the operator being required only to depress the proper keys and operate the justification lever at the end of each line.

As the perforations are made in the order in which the characters occur in composition, the ribbon may be fed direct from the apparatus herein described into the typographic apparatus and the type impressions may be made at the same time that the ribbon is being perforated.

While I have shown specific devices and mechanism for accomplishing the various operations and movements in the machine, my invention is not limited to such specific mechanism; but other devices and mechanisms operating to accomplish the various movements and operations in an analogous manner may be substituted without departing from the spirit and scope of my invention.

Having thus described my invention, what I claim as new therein and desire to secure by Letters Patent is:

1. A key action comprising a hammer pivotally supported at one end with its center of gravity outside the vertical line passing through its point of support, means to keep the hammer normally in substantially vertical position and key operated means to drop said hammer.

2. A key-action comprising a hammer pivotally supported at its lower end with its center of gravity outside the vertical line passing through its point of support and means normally holding said hammer in substantially vertical position, said means arranged to be operated by the keys to release the same and allow the hammer to drop.

3. A key-action comprising a hammer pivotally supported at one end with its center of gravity outside the vertical line passing through its point of support, a pawl engaging said hammer to prevent the same from falling, and a key to disengage the pawl.

4. A key-action comprising a hammer pivoted near its lower end, a notch in the hammer near its pivot, a pawl normally engaging said notch and retaining the hammer in raised position with its center of gravity outside the vertical line through its pivotal support, and a key to disengage said pawl and allow the same to drop under the influence of gravity, and a spring engaging said hammer tending to accelerate its drop.

5. A key-action comprising a hammer pivoted near its lower end, a notch near the lower end of the hammer, a spring-pressed pawl engaging said notch and retaining the hammer in said position with its center of gravity outside the vertical line through its pivotal support, a key, spring engagement between said key and pawl whereby the latter is disengaged from the hammer and allows the same to drop under the influence of gravity.

6. A key-action comprising a hammer pivotally supported near its lower end and provided with a shoulder near said end, a pawl normally engaging said shoulder and retaining the hammer in raised position, coöperating cam faces on said pawl and hammer, key-operated means to disengage the pawl and hammer and key-operated means to cause the cam-faces on the pawl and hammer to coöperate to return the pawl into engagement with the hammer.

7. A key-action comprising a hammer pivotally supported near its lower end, a pawl engaging said hammer and normally retaining the same in raised position, key-operated means to disengage said pawl and allow the hammer to fall, key-operated means to project said hammer against its striking point, and coöperating means on said pawl and hammer to prevent the hammer reaching its striking point without returning the pawl into engagement with the hammer.

8. In a machine for making a controlling strip for automatic typographic apparatus, a keyboard, a series of strip-marking devices severally corresponding to keys in the keyboard, and a series of hammers corresponding to the strip-marking devices and actuated by corresponding keys in the keyboard.

9. In a machine for making a controlling strip for automatic typographic apparatus, a keyboard, a series of strip-marking devices corresponding to keys in the keyboard a series of hammers corresponding to the strip-marking devices and actuated by corresponding keys in the keyboard, and connections between the keys and hammers whereby the strip-marking device corresponding to an operated key is actuated upon operation of the succeeding key.

10. In a machine for making a controlling strip for automatic typographic apparatus, a keyboard, a series of strip-marking devices corresponding to keys in the keyboard a series of hammers corresponding to the strip-marking devices and actuated by corresponding keys in the keyboard, said hammers pivoted at their lower ends, means to retain said hammers in upright position, key-actuated means to cause a hammer to fall on operation of its corresponding key, and means actuated by the next operated key to return said fallen hammer and cause it to actuate its corresponding strip-marking device.

11. In a machine for making a controlling strip for automatic typographic apparatus, a keyboard, a series of strip-marking devices corresponding to keys in the keyboard a series of hammers corresponding to the strip-marking devices and actuated by corresponding keys in the keyboard, said hammers pivoted at their lower ends, means to retain said hammers in upright position, key-actuated means to cause a hammer to fall on operation of its corresponding key, and means actuated by the next operated key to return said fallen hammer and cause it to actuate its corresponding strip-marking device and resume its engagement with its retaining means.

12. In a machine for making controller-strips for automatic typographic apparatus, a series of strip-marking devices, a series of pivotally mounted hammers corresponding to said strip-marking devices, a series of retaining pawls for said hammers, a keyboard, key connections with each of said pawls to disengage the same and release said hammers, means common to the keys to return said hammers, actuate said strip-marking devices and reëngage said pawls and hammers.

13. In a machine for making controller-strips for automatic typographic apparatus, a series of strip-marking devices, a series of pivotally mounted hammers corresponding to said strip-marking devices, a series of retaining pawls for said hammers, a keyboard, key connections with each of said pawls for said hammers, a keyboard, key connections with each of said pawls to disengage the same and release said hammers, a bail-rod common to the hammers and adapted to engage the same when released, said bail-rod in engagement with the keys whereby the operation of a key returns a released hammer, actuates the corresponding strip-marking device and simultaneously reëngages the hammer and its pawl.

14. In a machine for making a controlling strip for automatic typographic apparatus, a keyboard, a series of strip-marking devices severally corresponding to keys in the keyboard, and a series of hammers corresponding to the strip-marking devices, and mechanism to count and store the space-units of the characters represented by operated keys.

15. In a machine for making a controlling-strip for automatic typographic apparatus, a keyboard, a series of strip-marking devices and a series of hammers corresponding to the keys of the keyboard, a space-unit counting and storing mechanism, means actuated on operation of a key to count and store the space-units corresponding to the character represented by said operated key, and means actuated by the next operated key to mark the strip to represent the previously operated key.

16. In a machine for making controller-strips for automatic typographic apparatus, a keyboard, a series of devices for marking the strip along a transverse line thereof with marks representing typographic characters and functions in a predetermined order of sequence, a series of key-operated hammers for actuating the strip-marking devices, means to feed said strip forward automatically for a new transverse line of marks when a character or function out of said order is to be represented on the strip.

17. In a machine for making controller-strips for automatic typographic apparatus, a series of strip-marking devices arranged in a definite order of sequence, a series of hammers for actuating the same, a keyboard the keys of which control the hammers, mechanism for feeding the strip adjacent the marking devices, means for actuating the strip-feeding mechanism when a character or function out of the sequence in which said marking devices are arranged is to be represented.

18. In a machine for making controller-strips for automatic typographic apparatus, mechanism to feed the strip through the machine, means to mark the strip along transverse lines thereof with marks representing typographic characters and functions in a predetermined order of sequence, a sequence controller to engage and actuate the strip-feeding means at the completion of every sequence.

19. In a machine for making controller-strips for automatic typographic printing apparatus, a series of strip-marking devices, a series of hammers to actuate said marking devices, a series of hammer-retaining pawls, a sequence-controller, means to move said sequence-controller in a path adjacent the hammer-retaining pawls, a series of keys corresponding to the strip-marking devices and engaging said pawls to move the same into the path of the sequence-controller and arrest the same.

20. In a machine for making controller-strips for automatic typographic printing apparatus, a series of strip-marking devices, a series of hammer-retaining pawls, a sequence-controller, means to move said sequence-controller in a path adjacent the hammer-retaining pawls, a series of keys corresponding to the hammers and strip-marking devices, said keys when operated having engagement with said hammers and their pawls to project the pawls into the path of the sequence-controller and cause the hammers to actuate the strip-marking devices.

21. In a machine for making controller strips for automatic typographic printing apparatus, a series of strip-marking devices, a series of hammers to actuate said marking devices, a series of hammer-retaining means, a sequence controller, means to move said sequence controller in a path adjacent the hammer retaining means, a series of keys corresponding to the strip marking devices and engaging said means to move the same into the path of the sequence controller and arrest the same.

22. In a machine for making a controller-strip for an automatic typographic apparatus in which the types are brought to position in a definite order of sequence, a sequence-controller in the strip-marking machine for causing said machine automatically to mark the strip in accordance with the sequence of the type in the printing machine, a fluid-pressure device to actuate said sequence-controller.

23. In a machine for making a controller-strip for an automatic typographic apparatus in which the types are brought to position in a definite order of sequence, a sequence-controller in the strip-marking machine for causing said machine automatically to mark the strip in accordance with the sequence of the type in the typographic apparatus, a fluid-pressure device to actuate said sequence-controller, said fluid-pressure device controlled by the movement of the sequence-controller.

24. In a machine for making controller-strips for automatic typographic apparatus, a keyboard, a series of devices for marking the strip along a transverse line thereof with marks representing typographic characters and functions in a predetermined order of sequence, a series of key-operated hammers for actuating the strip-marking devices, means to feed said strip forward automatically for a new transverse line of marks between repeated representations of the same character or function.

25. In a machine for making controller-strips for automatic typographic apparatus, a series of strip-marking devices, a series of hammers to actuate said marking devices, a series of hammer-retaining pawls, a sequence-controller, means to move said sequence-controller in a path adjacent the hammer-retaining pawls, a series of keys corresponding to the strip-marking devices and engaging said pawls to move the same into the path of the sequence-controller and arrest the same, mechanism controlled by the sequence-controller for feeding the strip, and means actuated on consecutive operation of the same key to release the sequence-controller from its arrest and permitting its actuation of the strip-feeding mechanism.

26. In a machine for making controller-strips for automatic typographic apparatus, a series of strip-marking devices, a series of hammers to actuate said marking devices, a series of hammer-retaining pawls, a sequence-controller, means to move said sequence-controller in a path adjacent the hammer-retaining pawls, a series of keys corresponding to the strip-marking devices, flexible connections between said keys and the pawls whereby operation of a key moves the corresponding pawl into the path of the sequence-controller and arrests the same, mechanism controlled by the sequence-controller for feeding the strip, and means actuated on consecutive operation of the same key to release the sequence-controller from its arrest and permitting its actuation of the strip-feeding mechanism.

27. In a machine for making controller-strips for automatic typographic apparatus, a series of strip-marking devices, a series of hammers to actuate said marking devices, a series of hammer-retaining pawls, a sequence-controller, means to move said sequence-controller in a path adjacent the hammer-retaining pawls, a series of keys corresponding to the strip-marking devices, flexible connections between said keys and the pawls whereby operation of a key moves the corresponding pawl into the path of the sequence-controller and arrests the same, mechanism controlled by the sequence-controller for feeding the strip, and means actuated on consecutive operation of the same key to withdraw the pawl from the path of the sequence-controller and permit the latter to actuate the strip-feeding mechanism, said flexible connection permitting operation of the corresponding hammer before return of the key to normal position.

28. In a machine for making controller-strips for automatic typographic apparatus, a series of strip-marking devices, mechanism for feeding the strip adjacent the marking devices, a keyboard, a series of hammers corresponding to the series of marking devices and operated by the keys, a series of hammer-retaining pawls, a sequence-controller actuated by continuous pressure to move adjacent the series of pawls and engaging the feeding mechanism at one point in its path, flexible connections between the keys and the pawls whereby actuation of a key throws the corresponding pawl into the path of the sequence-controller, and coöperating cam faces on the pawls and hammers whereby on repeated actuations of the same key the pawl is momentarily withdrawn from the path of the sequence-controller to allow the latter to engage the feeding mechanism, and the pawl is returned to position to arrest the sequence-controller.

29. In a machine for making controller-strips for automatic typographic apparatus, a keyboard, a series of strip-marking devices, a corresponding series of actuating devices for the same controlled by the keys of the keyboard, means to place the marks along transverse lines on the strip in accordance with a predetermined order of sequence.

30. In a machine for making controller-strips for automatic typographic apparatus, a keyboard, a series of strip-marking devices and a corresponding series of actuating devices for the same controlled by the keys of the keyboard, means to place the marks on the strips in predetermined order of sequence, said means comprising a sequence-controller moving adjacent the strip-marking devices, and a series of stops corresponding to and actuated by keys of the keyboard for arresting the movement of the sequence-controller.

31. In a machine for making controller-strips for automatic typographic apparatus, a keyboard, a series of strip-marking devices and a corresponding series of actuating devices for the same controlled by the keys of the keyboard, means to place the marks on the strips in predetermined order of sequence, said means comprising a sequence-controller reciprocating adjacent the strip-marking devices, and a series of stops corresponding to and actuated by keys of the keyboard for arresting the movement of the sequence-controller.

32. In a machine for making controller-strips for automatic typographic apparatus, a keyboard, a series of strip-marking devices and a corresponding series of actuating devices for the same controlled by the keys of the keyboard, means to place the marks on the strips in predetermined order of sequence, said means comprising a sequence-controller moving adjacent the strip-marking devices, continuous pressure means for actuating said sequence-controller, and a series of stops corresponding to and actuated by keys of the keyboard for arresting the movement of the sequence-controller.

33. In a machine for making controller-strips for automatic typographic apparatus, a keyboard, a series of strip-marking devices and a corresponding series of actuating devices for the same controlled by the keys of the keyboard, means to place the marks on the strips in predetermined order of sequence, said means comprising a sequence-controller moving adjacent the strip-marking devices, continuously acting fluid-pressure means for actuating said sequence-controller, and a series of stops corresponding to and actuated by keys of the keyboard for arresting the movement of the sequence-controller.

34. In a machine for making controller-strips for automatic typographic apparatus, a keyboard, a series of strip-marking devices and a corresponding series of actuating devices for the same controlled by the keys of the keyboard, means to place the marks on the strips in predetermined order of sequence, said means comprising a sequence controller moving adjacent the strip-marking devices, continuously acting fluid-pressure means for actuating said sequence-controller, automatic means for reversing the direction of movement of said sequence-controller at each end of its path, and a series of stops corresponding to and actuated by keys of the keyboard for arresting the movement of the sequence-controller.

35. In a machine for making controller-strips for automatic typographic apparatus, a keyboard, a series of strip-marking devices and a corresponding series of actuating devices for the same controlled by the keys of the keyboard, means to place the marks on the strips in predetermined order of sequence, said means comprising a sequence-controller moving adjacent the strip-marking devices, continuously acting fluid-pressure means for actuating said sequence-controller, valves for controlling the direction of the fluid pressure, said valves actuated by the sequence-controller, and a series of stops corresponding to and actuated by keys of the keyboard for arresting the movement of the sequence-controller.

36. In a machine for making controller-strips for automatic typographic apparatus, a keyboard, a series of strip-marking devices and a corresponding series of actuating devices for the same controlled by the keys of the keyboard, means to place the marks on the strips in predetermined order of sequence, said means comprising a sequence-controller moving adjacent the strip-marking devices, continuously acting fluid-pressure means for actuating said sequence-controller, valves for controlling the direction of the fluid pressure, connections from said valves extending into the path of the sequence-controller, and a series of stops corresponding to and actuated by keys of the keyboard for arresting the movement of the sequence-controller.

37. In a machine for making controller-strips for automatic typographic apparatus, a keyboard, a series of strip-marking devices, a series of hammers corresponding thereto, a corresponding series of hammer-engaging pawls actuated by the keys, stop-lugs on said pawls, a sequence-counter moving adjacent said stop-lugs and engaged by actuated stop-lugs.

38. In a machine for making controller-strips for automatic typographic apparatus, a keyboard, a series of strip-marking devices, a series of hammers corresponding thereto, a corresponding series of hammer-engaging pawls actuated by the keys, stop-lugs on said pawls, said stop-lugs arranged in two rows, a sequence-controller reciprocated adjacent said rows, and means on said sequence-controller to engage and arrest the same successively at the actuated stop-lugs of one row when moving in one direction while permitting it to pass the actuated stop-lugs of the other row.

39. In a machine for making controller-strips for automatic typographic apparatus, a keyboard, a series of strip-marking devices, a series of hammers corresponding thereto, a corresponding series of hammer-engaging pawls actuated by the keys, stop-lugs on said pawls, said stop-lugs arranged in two rows, a sequence-controller reciprocated adjacent said rows, and means on said sequence-controller to engage and arrest the same successively at the actuated stop-lugs of one row when moving in one direction and to engage and arrest the same successively at the actuated stop-lugs of the other row when moving in the reverse direction.

40. In a machine for making controller-strips for automatic typographic apparatus, a keyboard, a series of strip-marking devices, a series of hammers corresponding thereto, a corresponding series of hammer-engaging pawls actuated by the keys, stop-lugs on said pawls, said stop-lugs arranged in two rows, a sequence-controller reciprocated adjacent said rows, oppositely-faced spring-mounted pawls on said sequence-controller, said pawls in position to engage the actuated stop-lugs of the two rows respectively.

41. In a machine for making controller-strips for automatic typographic apparatus, a keyboard, a unit-counting mechanism comprising a unit-gage provided with a series of stops representing the unit values of typographic characters and spaces, interponents corresponding to and actuated by the keys of the keyboard and coöperating with said unit-gage, a unit-counting device the extent of movement of which is governed by the movement of said interponents as controlled by the stops of the gage.

42. In a machine for making controller-strips for automatic typographic apparatus, a keyboard, a unit-counting mechanism comprising a unit-gage provided with a series of stops representing the unit values of typographic characters and spaces, interponents corresponding to and actuated by the keys of the keyboard and coöperating with said unit-gage, a rotary unit-counting device the extent of rotation of which is governed by the movement of said interponents as controlled by the stops of the gage.

43. In a machine for making controller-strips for automatic typographic apparatus, a keyboard, a unit-counting mechanism comprising a unit-gage provided with a series of stops representing the unit values of typographic characters and spaces, interponents corresponding to and actuated by the keys of the keyboard and coöperating with said unit-gage, a ratchet and pawl, the movement of said pawl governed by the movement of said interponents as controlled by the stops of the gage.

44. In a machine for making controller-strips for automatic typographic apparatus, a keyboard, a unit-counting mechanism comprising a unit-gage provided with stops representing the unit values of typographic characters and spaces, a series of cam-interponents corresponding to keys in the keyboard and coöperating with the stops of said gage, a bail-rod engaged by said interponents, a ratchet and a resiliently mounted pawl therefor, said pawl engaged by said bail-rod, the movement of said pawl controlled by the movement of the bail-rod as governed by the movement of a cam-interponent and its corresponding gage stop.

45. In a machine for making controller-strips for automatic typographic apparatus, a keyboard, a unit-counting mechanism comprising a unit-gage provided with stops representing the unit values of typographic characters and spaces, a series of levers corresponding to and actuated by keys in the keyboard, a bail-rod, a cam-slot in each of said levers embracing said bail-rod, a ratchet and a pawl therefor, the movement of said pawl controlled by the bail-rod, a unit-gage provided with a series of stops representing unit values of typographic characters and spaces, said stops limiting the movement of said levers.

46. In a machine for making controller strips for automatic typographic apparatus, a series of keys, a unit counting device, a series of unit value stops corresponding to the keys, interponents between the keys and the stops, the movement of the interponents being determined by their corresponding stops, means operated by the interponents to designate corresponding unit values on the unit counting device, and means to operate said device, in accordance with the designated unit value.

47. A machine for making controller-strips for automatic typographic apparatus including in combination a series of keys which signify typographic characters and spaces, a ratchet, a spring-actuated pawl therefor, and mechanical connections between the key and pawl for moving the pawl a distance corresponding to the unit value of the character represented by the key.

48. A machine for making controller-strips for automatic typographic apparatus including in combination a series of keys which signify typographic characters and spaces, a ratchet, a spring-actuated pawl therefor, mechanical connections between the key and pawl for moving the pawl a distance corresponding to the unit value of the character represented by the key, and means acting on the return of said pawl to lock the ratchet from extra movement.

49. A machine for making controller-strips for automatic typographic apparatus including in combination a series of keys which signify typographic characters and spaces, a unit-storing device, actuating means for said unit-storing device, and connections from said keys to said actuating means for determining the amount of movement received by the unit-storing device from the operation of a particular key and key controlled means for changing the unit record for the different cases of a character.

50. In a machine for making controller-strips for automatic typographic apparatus, a keyboard, a unit-counting mechanism comprising a unit-gage provided with stops representing the unit values of typographic characters and spaces, a series of levers corresponding to and actuated by keys in the keyboard, a bail-rod, a cam-slot in each of said levers embracing said bail-rod, one side of said slot acting to move said bail-rod and the other side acting to arrest the same, a ratchet and a pawl therefor, the movement of said pawl controlled by the bail-rod, a unit-gage provided with a series of stops representing unit values of typographic characters and spaces, said stops limiting the movement of said levers.

51. In a machine for making controller-strips for automatic typographic apparatus, a keyboard, a unit-counting mechanism comprising a unit-gage provided with stops representing the unit values of typographic characters and spaces, a series of levers corresponding to and actuated by keys in the keyboard, a bail-rod, a cam-slot in each of said levers embracing said bail-rod, a ratchet and a pawl therefor, the movement of said pawl controlled by the bail-rod, a cam-face on said pawl, a cam-faced stop therefor, said cam-faces coöperating to insure the engagement of said pawl with the ratchet, a unit-gage provided with a series of stops representing unit values of typographic characters and spaces, said stops limiting the movement of said levers.

52. In a machine for making controller-strips for automatic typographic apparatus, a keyboard, a unit-counting mechanism comprising a unit-gage provided with stops representing the unit values of typographic characters and spaces, a series of levers corresponding to and actuated by keys in the keyboard, a bail-rod, a cam-slot in each of said levers embracing said bail-rod, one side of said slot acting to move said bail-rod and the other side acting to arrest the same, a ratchet and a pawl therefor, the movement of said pawl controlled by the bail-rod, a cam-face on said pawl, a cam-faced stop therefor, said cam-faces coöperating to insure the engagement of said pawl with the ratchet, a unit-gage provided with a series of stops representing unit values of typographic characters and spaces, said stops limiting the movement of said levers.

53. In an apparatus of the character described a key-lever, a stop device and an interponent, a connection between the key-lever and the interponent consisting of a rod having pivotal connection with the key-lever and a slotted portion in engagement with the interponent, a guide on the interponent through which said slotted portion is received.

54. In an apparatus of the character described a key-lever, a stop device and an interponent, a connection between the key-lever and the interponent consisting of a rod having pivotal connection with the key-lever and a slotted portion in engagement with the interponent, a guide on the interponent through which said slotted portion is received, and a spring on said rod bearing against the interponent.

55. In an apparatus of the character described, a key-lever, a stop device and an interponent, a connection between said key-lever and interponent consisting of a rod having pivotal connection with the key-lever at one end and slotted at its other end to receive the interponent, an aperture in the interponent, a guide in said aperture projecting beyond the sides of the interponent, the bifurcated end of said rod formed by the slot passing through said guide and embracing said interponent, a slidable collar and a lug on said rod and a spring between said lug and collar bearing upon said collar and through the latter on the interponent.

56. In an apparatus of the character described a key-lever, a stop device and an interponent, a connection between said key-lever and the interponent consisting of a rod pivotally connected at one end with the key-lever and slotted at the other end to receive the interponent, an aperture in the interponent, a guide carried in said aperture and projecting beyond the sides of the interponent, the bifurcated end of the rod formed by the slot passing through said guide and embracing the interponent, a slidable collar and a lug on said rod, a spring between said lug and collar bearing upon the collar and through the latter on the interponent, and a bearing portion formed on the interponent on which said collar bears to permit of a relative motion between the collar and the interponent.

57. In a machine for making controller-strips for automatic typographic apparatus, a series of keys, a corresponding series of cam-levers operated thereby, a swinging bail-rod common to said cam-levers and engaged thereby, a unit-counting device, said bail-rod in two portions, one each side of said unit-counting device, means engaged by both portions of the bail-rod and engaging the unit-counting device whereby movement of a cam-lever is transmitted to said unit-counting device and means to govern the movement of the cam-levers in accordance with the unit values of the characters and spaces represented by the keys.

58. In a machine for making controller-strips for automatic typographic apparatus, a series of keys, a swinging bail-rod common thereto, a unit-counting device, connections between said bail-rod and the keys, means engaged by the bail-rod for governing the movement of said unit-counting device, and other means for controlling the movement of the bail-rod engaging means in accordance with the unit values of the characters and spaces designated by the keys.

59. In a machine for making controller strips for automatic typographic apparatus, a series of keys, a series of stops severally corresponding to the unit values of the characters, spaces, etc., represented by said keys, a unit counting device, connections between the keys and the stops, and means controlled by said connections to operate the unit counting device in accordance with the unit value of an operated key.

60. In a machine for making controller strips for automatic typographic apparatus, a series of keys, a series of stops severally corresponding to said keys and representing the unit values of the characters, spaces, etc., represented by said keys, a unit counting device, connections between said keys and the stops and means controlled by said connections to operate the unit counting device in accordance with the unit value of the operated key, a unit storing device to store or accumulate the units counted by the counting device, and a detachable connection between the unit counting device and the unit storing device.

61. In a machine for making controller-strips for automatic typographic apparatus, a unit-counting device movable in accordance with the unit values of the characters and spaces represented, a unit-storing device comprising a slide, a disk in engagement therewith, and a connection between said disk and the unit-counting device whereby the said disk is moved in accordance with the movement of the unit-counting device.

62. In a machine for making controller-strips for automatic typographic apparatus, a unit-counting device movable in accordance with the unit values of the characters and spaces represented, a unit-storing device comprising a slide, a disk in engagement therewith, a connection between said disk and the unit-counting device whereby the latter is moved in accordance with the movement of the unit-counting device, and means to resist the movement of the unit-counting device.

63. In a machine for making controller strips for automatic typographic apparatus, a series of keys, a series of stops severally corresponding to said keys and representing the unit values of the characters, spaces, etc., represented by the keys, connections between the keys and the stops, a unit counting device and means controlled by said connections to operate the unit counting device in accordance with the unit values of the operated keys, a unit storing device to store or accumulate the units counted by the counting device, and means to control the movement of said storing device in accordance with a pre-determined length of line of composed matter.

64. In a machine for making controller strips for automatic typographic apparatus, a series of keys, a unit counting device, means common to said keys for operating said unit counting device, means severally corresponding to said keys to control the movement of the unit counting device in accordance with the unit values of the characters, spaces, etc., represented by said keys, a unit storing device having detachable engagement with the unit counting device.

65. In a machine for making controller-strips for automatic typographic apparatus, a unit-counting device movable in accordance with the unit values of the characters and spaces represented, a unit-storing device comprising a slide, a disk in engagement therewith, a connection between said disk and the unit-counting device whereby the latter is moved in accordance with the movement of the unit-counting device, and means to resist the movement of the unit-counting device.

66. In a machine for making controller-strips for automatic typographic apparatus, a unit-counting device movable in accordance with the unit values of the characters and spaces to be represented, a unit-storing device comprising a slide, a disk operatively connected therewith, and an arm moving with the unit-counting device and having engagement with said disk.

67. In a machine for making controller-strips for automatic typographic apparatus, a unit-counting device movable in accordance with the unit values of the characters and spaces to be represented, a unit-storing device comprising a slide, a disk operatively connected therewith, an arm moving with the unit-counting device and provided with spring-mounted means to engage the disk.

68. In a machine for making controller-strips for automatic typographic apparatus, a unit-counting device movable in accordance with the unit values of the characters and spaces to be represented, a unit-storing device comprising a slide, a disk operatively connected therewith, holes in said disk, and an arm moving with the unit-counting device and provided with means to engage the holes in said disk.

69. In a machine for making controller-strips for automatic typographic apparatus, a unit-counting device movable in accordance with the unit values of the characters and spaces to be represented, a unit-storing device comprising a slide, a disk operatively connected therewith, a series of concentric holes in said disk, an arm connected to and moving with the unit-counting device, said arm provided with a pin to engage the holes in the disk.

70. In a machine for making controller-strips for automatic typographic apparatus, a unit-counting device movable in accordance with the unit values of the characters and spaces to be represented, a unit-storing device comprising a slide, a disk operatively connected therewith, a double series of holes in said disk, an arm connected to and moving with the unit-counting device, said arm provided with means to engage either series of holes in the disk.

71. In a machine for making controller-strips for automatic typographic apparatus, a unit-counting device movable in accordance with the unit values of the characters and spaces to be represented, a unit-storing device comprising a slide, a disk operatively connected therewith, a double series of holes in said disk, an arm connected to and moving with the unit-counting device, said arm provided with separate means for engaging each series of holes, the holes in the disk and the engaging means therefor being relatively arranged so that only one series of holes is engaged at a time.

72. In a machine for making controller-strips for automatic typographic apparatus, a unit-counting device movable in accordance with the unit values of the characters and spaces to be represented, a unit-storing device comprising a slide, a disk operatively connected therewith, a double series of holes in said disk, an arm connected to and moving with the unit-counting device, said arm provided with spring-mounted pins to engage the series of holes in the disk.

73. In a machine for making controller-strips for automatic typographic apparatus, a unit-counting device movable in accordance with the unit values of the characters and spaces to be represented, a unit-storing device comprising a slide, a disk operatively connected therewith, a double series of holes in said disk, the holes of one series opposite the intervals between the holes of the other series, an arm having a pair of spring-mounted pins arranged radially with respect to said disk to engage the holes therein whereby when one pin engages the disk the other pin is depressed against its spring, and connections between the arm and the unit-counting device to cause the parts to move together.

74. In a machine for making controller-strips for automatic typographic apparatus, a unit-counting device movable in accordance with the unit values of the characters and spaces to be represented, a unit-storing device comprising a slide, a disk operatively connected therewith, an arm moving with the unit-counting device and having engagement with said disk, and means to disengage said arm and disk.

75. In a machine for making controller-strips for automatic typographic apparatus, a unit-counting device movable in accordance with the unit values of the characters and spaces to be represented, a unit-storing device comprising a slide, a disk operatively connected therewith, an arm moving with the unit-counting device and having engagement with said disk, and key-operated means to disengage said arm and disk.

76. In a machine for making controller-strips for automatic typographic apparatus, a unit-counting device movable in accordance with the unit values of the characters and spaces to be represented, a unit-storing device comprising a slide, a disk operatively connected therewith, an arm moving with the unit-counting device and having engagement with said disk, and key-operated means to disengage said arm and disk and restore said disk to initial position.

77. In a machine for making controller-strips for automatic typographic apparatus, a unit-counting device movable in accordance with the unit values of the characters and spaces to be represented, a unit-storing device comprising a rack, a disk having a pinion thereon in engagement with said rack, and an arm moving with the unit-counting device and having engagement with said disk.

78. In a machine for making controller-strips for automatic typographic apparatus, a unit-counting device movable in accordance with the unit values of the characters and spaces to be represented, a unit-storing device comprising a rack, a disk having a pinion thereon in engagement with said rack, a double series of holes in said disk, the holes of one series opposite the intervals between the holes of the other series, an arm having a pair of spring-mounted pins arranged radially with respect to said disk to engage the holes therein whereby when one pin engages the disk the other pin is depressed against its spring, and connections between the arm and the unit-counting device to cause the parts to move together.

79. In a machine for making controller-strips for automatic typographic apparatus, a unit-counting device comprising a rotary wheel, a shaft upon which the same is mounted to rotate therewith, means to rotate said wheel and shaft in accordance with the unit values of the characters and spaces to be represented, a disk or wheel loosely mounted on said shaft, an arm mounted to rotate with a slide upon said shaft, said arm provided with means to engage the disk or wheel, and means to move said arm in and out of engagement with said disk, and means moved by said disk to aggregate the unit values of the characters and spaces represented.

80. In a machine for making controller-strips for automatic typographic apparatus, unit-storing mechanism and justification setting mechanism, the latter comprising a controller in position to be engaged by the unit-storing mechanism, said controller having a limited movement corresponding to a whole number of units and representing the maximum amount of justification.

81. In a machine for making controller-strips for automatic typographic apparatus, unit-storing mechanism and justification setting mechanism, the latter comprising a controller engaged and moved by the unit-storing mechanism when said storing mechanism has stored up to a predetermined number of units less than the full unit value of lines for which the machine is set.

82. In a machine for making controller strips for automatic typographic apparatus, a unit storing mechanism comprising a progressively moving slide, a justification-setting mechanism comprising a controlling device arranged in the path of and actuated by said slide, said controlling device governing the setting of the justification mechanism.

83. In a machine for making controller strips for automatic typographic apparatus, a unit storing mechanism comprising a progressively moving slide, a justification setting mechanism comprising a controlling device arranged in the path of and movable by said slide and manually controlled, means for moving said controlling device, the movement of said controlling device, governing the setting of a justification mechanism.

84. In a machine for making controller-strips for automatic typographic apparatus, a unit-storing mechanism comprising a progressively moving slide, a justification setting mechanism comprising a slide arranged in the path of said storing slide and movable thereby in the same direction therewith.

85. In a machine for making controller-strips for automatic typographic apparatus, a unit-storing mechanism comprising a progressively moving slide, a justification setting mechanism comprising a slide arranged in the path of said storing slide and movable thereby in the same direction therewith, and manually-controlled means for moving the slide of the justification setting mechanism in the same direction.

86. In a machine for making controller-strips for automatic typographic apparatus, a unit-storing mechanism comprising a progressively moving slide, a justification setting mechanism comprising a controller arranged in the path of and movable by said slide, continuously acting pressure means resisting the movement of said controller, and means to retain said controller in the position in which it is left.

87. In a machine for making controller-strips for automatic typographic apparatus, a unit-storing mechanism comprising a progressively moving slide, a justification setting mechanism comprising a controller arranged in the path of and movable by said slide, continuously acting pressure means resisting the movement of said controller, means to retain said controller in the position in which it is left, means to retain the slide in the position in which it is left, and means to release said retaining means and return both the slide and the controller to initial position.

88. In a machine for making controller-ribbons for automatic typographic apparatus, a keyboard for operating the machine, and means for correcting mistakes made in operating the key-board, said means including a delaying device between the keyboard and the means for marking the controller ribbon, and means for marking the controller.

89. In a machine for making controller-ribbons for automatic typographic apparatus, a keyboard for operating the machine, a correction key, and means controlled thereby for correcting mistakes made in operating the machine, said means operating to control the means for marking the controller, and means for marking the controller.

90. In a machine for making controller-ribbons for automatic typographic apparatus, a keyboard for operating the machine, and means for correcting mistakes made in counting the unit values of the characters or spaces and means for marking the characters upon the controller.

91. In a machine for making controller-ribbons for automatic typographic apparatus, a keyboard for operating the machine, and means for correcting the operation of the unit-counting and storing mechanisms when said mechanisms have been operated by improper keys.

92. In a machine for making controller-ribbons for automatic typographic apparatus, a keyboard for operating the machine, a correction key for correcting the operation of the unit-counting and storing mechanisms when said mechanisms have been operated by improper keys.

93. In a machine for making controller-ribbons for automatic typographic apparatus, a keyboard for operating the machine, and means for subtracting the unit value represented by an improper key action from the units which have been counted and stored.

94. In a machine for making controller-ribbons for automatic typographic apparatus, a keyboard, mechanism to count and store the unit values of the characters and spaces represented by the keys, and means to reverse the operation of the unit-storing mechanism to subtract improperly stored units.

95. In a machine for making controller-strips for automatic typographic apparatus, a unit-counting device movable in accordance with the unit values of the characters and spaces represented, a unit-storing device, a connection moving with the unit-counting device and detachably engaging the unit-storing device, correction mechanism to disengage the counting and storing devices, and means to return said storing mechanism, the amount of said return controlled by the correction mechanism.

96. In a machine for making controller-strips for automatic typographic apparatus, a unit-counting device movable in accordance with the unit values of the characters and spaces to be represented, a unit-storing device comprising a slide, a disk operatively connected therewith, a series of concentric holes in said disk, an arm connected to and moving with the unit-counting device, said arm provided with a pin to engage the holes in the disk, key-controlled means to disengage said arm and disk, and means to return said disk and slide by limited amounts corresponding to unit values.

97. In a machine for making controller-strips for automatic typographic apparatus, a unit-counting device movable in accordance with the unit values of the characters and spaces to be represented, a unit-storing device comprising a slide, a disk operatively connected therewith, a series of concentric holes in said disk, an arm connected to and moving with the unit-counting device, said arm provided with a pin to engage the holes in the disk, an arm mounted adjacent said disk on the side opposite thereof to said first-named arm, said second-named arm having a limited oscillatory movement equivalent to a unit value and provided with a pin to engage said disk, key-controlled means to move said second-named arm into engagement with the disk and simultaneously disengage the first-named arm therefrom, and continuously acting pressure means tending to return said disk when disengaged from said first-named arm.

98. In a machine for making controller-strips for automatic typographic apparatus, a unit-counting device movable in accordance with the unit values of the characters and spaces to be represented, a unit-storing device comprising a rack, a disk having a pinion thereon in engagement with said rack, a double series of holes in said disk, the holes of one series opposite the intervals between the holes of the other series, an arm having a pair of spring-mounted pins arranged radially with respect to said disk to engage the holes therein whereby when one pin engages the disk the other pin is depressed against its spring, connections between the arm and the unit-counting device to cause the parts to move together, a second arm similar to the first-named arm situated on the opposite side of said disk and mounted to have an oscillatory movement equivalent to a unit movement of said disk, and key-operated key-controlled means to move said arm into engagement with the disk and move the first-named arm out of engagement with said disk.

99. In a machine for making controller-strips for automatic typographic apparatus, means for marking the controller strip to designate a particular character which is carried in different cases or faces by the printing apparatus, means for actuating said marking means, a unit-gage provided with members corresponding to different type-faces, shift-keys designating the type-faces and corresponding to the gage-members, and connections between each shift-key and the gage whereby operation of a shift-key moves the corresponding gage member into operative position.

100. In a machine for making controller-strips for automatic typographic apparatus, means for marking the controller strip to designate a particular character which is carried in different cases or faces by the printing apparatus, means for actuating said marking means, a unit-gage provided with members corresponding to different type-faces, shift-keys designating the type-faces and corresponding to the gage-members, each of said shift-keys having the same extent of movement, and connections between said keys and the gage whereby the latter is moved by different amounts on operation of different shift-keys to bring the member thereof corresponding to the operated shift-key into operative position.

101. In a machine for making controller-strips for automatic typographic apparatus, means for marking the controller strip to designate a particular character which is carried in different cases or faces by the printing apparatus, means for actuating said marking means, a unit-gage provided with members corresponding to different type-faces, shift-keys designating the type faces and corresponding to the gage-members, each of said shift-keys having the same extent of movement, and connections between said keys and the gage whereby the latter is moved in different directions on operation of different shift-keys to bring the member thereof corresponding to the operated shift-key into operative position.

102. In a machine for making controller-strips for automatic typographic apparatus, means for marking the controller strip to designate a particular character which is carried in different cases or faces by the printing apparatus, means for actuating said marking means, a unit-gage provided with members corresponding to different type-faces, shift-keys designating the type-faces and corresponding to the gage-members, each of said shift-keys having the same extent of movement, and connections between said keys and the gage whereby the latter is moved by different amounts and in different directions on operation of different shift-keys to bring the member thereof corresponding to the operated shift-key into operative position.

103. In a machine for making controller-strips for automatic typographic apparatus, a unit-gage mounted to rotate and having members corresponding to different type-faces, a pinion on said gage, a rack engaging said pinion, shift-keys designating the type-faces, and connections between said keys and engaging the rack whereby the gage member corresponding to an operated shift-key is brought into operative position.

104. In a machine for making controller-strips for automatic typographic apparatus, a unit-gage mounted to rotate and having members corresponding to different type-faces, a pinion on said gage, a rack engaging said pinion, shift-keys designating the type-faces, the stems of said keys having cam-faces thereon, a series of pivotally mounted parts corresponding to the shift-keys and engaged by the cam surfaces on the stems thereof, said parts engaging the rack, whereby operation of a shift-key brings the corresponding gage-member into operative position.

105. In a machine for making controller-strips for automatic typographic apparatus, shift mechanism comprising shift-keys designating different type-faces, the stems of said keys formed with substantially V-shaped cam-faces, a series of pivotally mounted sectors corresponding to the shift-keys, a rack engaged by said sectors, a stud on each of said sectors engaged by the cam-face of the corresponding key stem, a unit-gage having members corresponding to the shift-keys, a pinion on said gage and engaging the rack, the studs occupying a position on the several sectors such that the depression of a shift-key rocks the corresponding sector until said stud is seated in the crotch of the V-shaped cam-face.

106. In a machine for making controller-strips for automatic typographic apparatus, means for marking the controller strip to designate a particular character which is carred in different cases or faces by the printing apparatus, means for actuating said marking means, a unit-gage provided with members corresponding to different type-faces, shift-keys designating the type-faces and corresponding to the gage-members, connections between each shift-key and the gage whereby operation of a shift-key moves the corresponding gage-member into operative position, and means to retain the gage in operated position.

107. In a machine for making controller-strips for automatic typographic apparatus, a unit-gage mounted to rotate and having members corresponding to different type-faces, a pinion on said gage, a rack engaging said pinion, shift-keys designating the type-faces, connections between said keys and engaging the rack whereby the gage-member corresponding to an operated shift-key is brought into operative position, and means to retain the gage in operated position.

108. In a machine for making controller-strips for automatic typographic apparatus, a unit-gage mounted to rotate and having members corresponding to different type-faces, a pinion on said gage, a rack engaging said pinion, shift-keys designating the type-faces, the stems of said keys having cam faces thereon, a series of pivotally mounted parts corresponding to the shift-keys and engaged by the cam surfaces on the stems thereof, said parts engaging the rack, whereby operation of a shift-key brings the corresponding gage-member into operative position, the cam-faces of the key stems having a stop portion preventing extra movement of the gage and means to retain the gage in operated position.

109. In a machine for making controller-strips for automatic typographic apparatus, means for marking the controller strip to designate a particular character which is carried in different cases or faces by the printing apparatus, means for actuating said marking means, a unit-gage provided with members corresponding to different type-faces, shift-keys designating the type-faces and corresponding to the gage-members, and connections between each shift-key and the gage whereby operation of a shift-key moves the gage from its last operative position direct to the operative position corresponding to an operated shift-key.

110. In a machine for making controller strips for automatic typographic apparatus, a series of strip marking devices, a scale adjacent said strip marking devices and representing the respective unit values thereof, and means directing the operator's attention to the unit value marked on said scale, which corresponds to the character space signified by an operated key.

111. In a machine for making controller-strips for automatic typographic apparatus, means for correcting improper or accidental key operation, comprising means to count and store the unit value of each character and space on operation of its key, means to postpone the marking of the strip or ribbon one key operation, means to indicate the unit value of each character or space on operation of its key, and means to reverse the unit-storing mechanism by an amount corresponding to the unit value.

112. In a machine for making a controller-strip for automatic typographic apparatus, a keyboard, a series of strip-marking devices corresponding to keys in the keyboard, unit-counting and storing mechanisms, means actuated on operation of a key to count, store and indicate the unit value of the character or space represented by said operated key, means actuated by the next operated key to mark the strip to represent the previously operated key, and means to reverse the operation of the unit-storing means for correcting improper or accidental key operation.

113. In a machine for making controller-strips for automatic typographic apparatus, a keyboard, a unit-counting mechanism comprising a unit-gage provided with a series of stops representing the unit values of typographic characters and spaces, levers corresponding to and actuated by the keys of the keyboard and coöperating with said unit-gage, a unit-counting device the extent of movement of which is governed by the movement of said levers as controlled by the stops of the gage, and means connected with the levers and unit-counting device to secure the latter from operation by another key when under the influence of an operated key.

114. In a machine for making controller-strips for automatic typographic apparatus, a series of strip marking devices, means for selectively operating said devices, means to feed a strip or ribbon adjacent said devices, a sequence controller for controlling the sequence of marks made upon the ribbon, an escapement mechanism for controlling the strip feeding means, said escapement mechanism operated by the sequence controller.

115. In a machine for making controller-strips for automatic typographic apparatus, a series of shift-keys, a series of strip-marking devices corresponding thereto and comprising a series of automatically operated hammers corresponding to the shift-keys, and means to make each shift-mark on the strip on a separate transverse line.

116. In a machine for making controller-strips for automatic typographic apparatus, a series of shift-keys, strip-marking devices corresponding to the shift-keys, a series of hammers and a series of pawls corresponding to the marking devices, a strip-feeding mechanism, and automatic means to actuate the strip-feeding mechanism before each operation of a strip-marking device.

117. In a machine for making controller-strips for automatic typographic apparatus, a series of shift-keys, strip-marking devices corresponding to the shift-keys, a series of hammers and a series of pawls corresponding to the marking devices, a strip-feeding mechanism, and automatically controlled fluid-pressure means to actuate the strip-feeding mechanism before each operation of a strip-marking device.

118. In a machine for making controller-strips for automatic typographic apparatus, a strip-marking mechanism, a sequence controller to arrange the marks on the strip according to a predetermined sequence, a strip-feeding mechanism comprising a feed-roll, power connection with said feed-roll constantly tending to rotate the same, an escapement mechanism connected with said feed-roll controlling the rotation of the same and actuated by the sequence controller.

119. In a machine for making controller-strips for automatic typographic apparatus, a strip-marking mechanism, a sequence controller to arrange the marks on the strip according to a predetermined sequence, a strip-feeding mechanism comprising a feed-roll, power connection with said feed-roll constantly tending to rotate the same, an escapement mechanism connected with said feed-roll controlling the rotation of the same and actuated by the sequence controller, said escapement mechanism comprising an escapement wheel on the feed-roll, a pivotally mounted escapement lever engaging the same, a spring latch in the stem of said lever and a stationary lug against which said latch abuts, and means actuated by the sequence controller to release said latch from the lug and allow an escapement of the feed-roll.

120. In a machine for making controller-strips for automatic typographic apparatus, a series of shift-keys, a series of strip-marking devices corresponding thereto, a strip-feeding mechanism, fluid-pressure means for actuating said feeding mechanism, and means engaged by each shift-key for controlling said fluid-pressure means.

121. In a machine for making controller-strips for automatic typographic apparatus, a series of shift-keys, a series of strip-marking devices corresponding thereto, a strip-feeding mechanism, fluid-pressure means for actuating said feeding mechanism, a spring-mounted swinging bail-rod engaging each of said shift-keys, an arm attached to said bail-rod, and a valve controlling said fluid-pressure means and engaged by said arm.

122. In a machine for making controller-strips for automatic typographic apparatus, a series of shift-keys, a series of strip-marking devices corresponding thereto, a strip-feeding mechanism, fluid-pressure means for actuating said feeding mechanism, a spring-mounted swinging bail-rod engaging each of said shift-keys, an arm attached to said bail-rod, a valve controlling said fluid-pressure means and engaged by said arm, and automatic means to disengage said valve and arm after the valve has been operated and return the valve to normal position.

123. In a machine for making controller-strips for automatic typographic apparatus, a strip-marking mechanism, a sequence controller to arrange the marks on the strip according to a predetermined sequence, a strip-feeding mechanism comprising a feed-roll, power connection with said feed-roll constantly tending to rotate the same, an escapement mechanism connected with said feed-roll controlling the rotation of the same and actuated by the sequence controller, said escapement mechanism comprising an escapement wheel on the feed-roll, a pivotally mounted escapement lever engaging the same, a spring latch in the stem of said lever and a stationary lug against which said latch abuts, a series of shift-keys, and means controlled by each shift-key to release said latch from the lug and allow escapement of the feed-roll.

124. In a machine for making controller-strips for automatic typographic apparatus, a strip-marking mechanism, a sequence controller to arrange the marks on the strip according to a predetermined sequence, a strip-feeding mechanism comprising a feed-roll, power connection with said feed-roll constantly tending to rotate the same, an escapement mechanism connected with said feed-roll controlling the rotation of the same and actuated by the sequence controller, said escapement mechanism comprising an escapement wheel on the feed-roll, a pivotally mounted escapement lever engaging the same, a spring latch in the stem of said lever and a stationary lug against which said latch abuts, and laterally flexible means actuated by the sequence-controller to release said latch from the lug and allow escapement of the feed-roll, said laterally flexible means permitting return movement of the escapement lever while the releasing means is in actuated position.

FRANK E. DRISCOLE.

Witnesses:
J. GREEN,
HENRY C. WORKMAN.